United States Patent
Zhang et al.

(10) Patent No.: US 10,637,691 B2
(45) Date of Patent: Apr. 28, 2020

(54) REFERENCE SIGNAL TRANSMISSION METHOD AND TRANSMISSION APPARATUS

(71) Applicant: Huawei Technologies Co., Ltd., Shenzhen (CN)

(72) Inventors: Xi Zhang, Chengdu (CN); Minghui Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/442,129

(22) Filed: Jun. 14, 2019

(65) Prior Publication Data

US 2019/0296946 A1 Sep. 26, 2019

Related U.S. Application Data

(63) Continuation of application No. PCT/CN2018/105765, filed on Sep. 14, 2018.

(30) Foreign Application Priority Data

Nov. 17, 2017 (CN) .......................... 2017 1 1148135

(51) Int. Cl.
*H04L 27/00* (2006.01)
*H04L 25/03* (2006.01)
(Continued)

(52) U.S. Cl.
CPC ...... *H04L 25/03159* (2013.01); *H04L 5/0048* (2013.01); *H04L 5/0051* (2013.01);
(Continued)

(58) Field of Classification Search
CPC . H04L 5/00; H04L 27/00; H04L 25/03; H04L 27/0014; H04L 27/2613;
(Continued)

(56) References Cited

U.S. PATENT DOCUMENTS

2014/0016622 A1  1/2014  Bao et al.
2014/0086085 A1  3/2014  Zheng et al.
(Continued)

FOREIGN PATENT DOCUMENTS

CN  102780532 A  11/2012
CN  103036820 A  4/2013
(Continued)

OTHER PUBLICATIONS

"Remaining details on PTRS design," 3GPP TSG RAN WG1 Meeting 90bis, Prague, CZ, R1-1718449, pp. 1-11, 3rd Generation Partnership Project, Valbonne, France (Oct. 9-13, 2017).
(Continued)

*Primary Examiner* — Syed Haider
(74) *Attorney, Agent, or Firm* — Leydig, Voit & Mayer, Ltd.

(57) ABSTRACT

A reference signal transmission method and transmission apparatus performing the method are described. The transmission method includes determining a resource block offset of a frequency domain position of a phase tracking reference signal (PTRS) of a terminal device based on PTRS information of the terminal device, an identifier of the terminal device, and first bandwidth. The PTRS information includes a frequency domain density or a frequency domain interval of the PTRS, and the first bandwidth is bandwidth scheduled by the network device for the terminal device. The network device transmits the PTRS with the terminal device based on the resource block offset of the frequency domain position of the PTRS. The described reference signal transmission method embodiments are helpful in randomizing PTRS interference.

12 Claims, 6 Drawing Sheets

(51) Int. Cl.
*H04L 5/00* (2006.01)
*H04L 27/26* (2006.01)

(52) U.S. Cl.
CPC ...... *H04L 27/0014* (2013.01); *H04L 27/2613* (2013.01); *H04L 2027/0026* (2013.01)

(58) Field of Classification Search
CPC ............. H04L 25/03159; H04L 5/0048; H04L 5/0051; H04L 2027/0026
See application file for complete search history.

(56) References Cited

U.S. PATENT DOCUMENTS

| | | | |
|---|---|---|---|
| 2017/0294926 A1* | 10/2017 | Islam | H04L 5/0051 |
| 2018/0198667 A1 | 7/2018 | He | |
| 2019/0081752 A1* | 3/2019 | Hunukumbure | H04W 72/0453 |
| 2019/0149299 A1* | 5/2019 | Lee | H04L 5/0092 370/329 |

FOREIGN PATENT DOCUMENTS

| | | |
|---|---|---|
| CN | 105827383 A | 8/2016 |
| CN | 106664278 A | 5/2017 |
| WO | 2017188591 A1 | 11/2017 |
| WO | 2018228458 A1 | 12/2018 |

OTHER PUBLICATIONS

"Designing for the future, the 5G NR Physical Layer," Ericsson Technology Review, 5G New Radio: Desigining for the Future, pp. 2-13, Ericsson AB, Stockholm Sweden (Jun. 27, 2017).

"Discussion on phase tracking RS design," 3GPP TSG RAN WG1 Meeting #88, Athens, Greece, R1-1702345, pp. 1-6, 3rd Generation Partnership Project, Valbonne, France (Feb. 3-17, 2017).

"3rd Generation Partnership Project; Technical Specification Group Radio Access Network; NR; Physical channels and modulation; (Release 15)," 3GPP TS 38.211 V1.0.0, pp. 1-37, 3rd Generation Partnership Project, Valbonne, France (Sep. 2017).

Zhong et al.,"Technology Research and Trial for 5G High-Frequency Systems," China Mobile Research Institute, Beijing, China (2017).

"Verizon 5G TF; Air Interface Working Group; Verizon 5th Generation Radio Access; Physical layer procedures (Release 1)," TS V5G.213 v1.4, Cellco Partnership d/b/a Verizon Wireless, pp. 1-50 (Oct. 2016).

"Phase and frequency tracking reference signal considerations," 3GPP TSG-RAN WG1 #89, Hangzhou, P.R. China, R1-1708599, pp. 1-6, 3rd Generation Partnership Project, Valbonne, France (May 15-19, 2017).

"PTRS for CP-OFDM," 3GPP TSG RAN WG1 Ad Hoc Meeting, Qingdao, China, pp. 1-6, R1-1709939; 3rd Generation Partnership Project, Valbonne, France (Jun. 27-30, 2017).

"PTRS for CP-OFDM," 3GPP TSG RAN WG1 Meeting #90, Prague, Czech Republic, R1-1712241, pp. 1-9, 3rd Generation Partnership Project, Valbonne, France (Aug. 21-25, 2017).

"Further details of PTRS," 3GPP TSG RAN WG1 Meeting #90bis, Prague, Czech Republic, R1-1717306, pp. 1-13, 3rd Generation Partnership Project, Valbonne, France (Oct. 9-13, 2017).

"Further details of PTRS," 3GPP TSG RAN WG1 Meeting AH NR#3, Nagoya, Japan, R1-1715473, pp. 1-11, 3rd Generation Partnership Project, Valbonne, France (Sep. 18-21, 2017).

\* cited by examiner

- PRIOR ART -

REFERENCE SIGNAL TRANSMISSION METHOD AND TRANSMISSION APPARATUS

CROSS-REFERENCE TO RELATED APPLICATIONS

This application is a continuation of International Application No. PCT/CN2018/105765, filed on Sep. 14, 2018 which claims priority to Chinese Patent Application No. 201711148135.2, filed on Nov. 17, 2017. The disclosures of the aforementioned applications are hereby incorporated by reference in their entireties.

TECHNICAL FIELD

This application relates to the communications field, and more specifically, to a reference signal transmission method and transmission apparatus in the communications field.

BACKGROUND

As a network system develops, requirements for a communication rate and a communication capacity gradually increase, and a requirement for high-frequency resources increases accordingly. However, a frequency increase is accompanied with an increase of phase noise generated by random jitter of a frequency component, namely, a local oscillator. Therefore, impact of the phase noise cannot be ignored in high-frequency wireless communication. Generally, a transmit end device may send a phase tracking reference signal (PTRS) that is known in advance, and a receive end may estimate phase noise based on the received PTRS.

When a plurality of terminal devices use a same PTRS sequence in one cell or sector, PTRS frequency domain positions to which the plurality of terminal devices perform mapping by using a same PTRS port are the same. In this case, different PTRSs mapped to a same frequency domain position interfere with each other, thereby affecting phase noise estimation. Therefore, how to randomize PTRS interference becomes an urgent problem to be resolved.

SUMMARY

This application provides a reference signal transmission method and transmission apparatus, to help randomize PTRS interference.

According to a first aspect, this application provides a reference signal transmission method, and the method includes: determining, by a network device, a resource block offset of a frequency domain position of a phase tracking reference signal (PTRS) of a terminal device based on PTRS information of the terminal device, an identifier of the terminal device, and first bandwidth, where the PTRS information includes a frequency domain density or a frequency domain interval of the PTRS, and the first bandwidth is bandwidth scheduled by the network device for the terminal device; and performing, by the network device, transmission of the PTRS with the terminal device based on the resource block offset of the frequency domain position of the PTRS.

According to the reference signal transmission method provided in this embodiment of this application, the resource block offset of the frequency domain position of the PTRS of the terminal device is determined by using information related to the terminal device, to help randomize PTRS interference, thereby stabilizing performance of PTRS-based phase noise estimation.

It should be understood that the network device may estimate phase noise based on a PTRS, or may estimate phase noise based on a phase compensation reference signal (PCRS). For consistency of description, the PTRS and the PCRS are collectively referred to as a PTRS in this embodiment of this application, and this is not limited in this embodiment of this application.

It should be further understood that a frequency domain density (a frequency domain interval) n of a PTRS may mean that a PTRS symbol is mapped to one in every n resource blocks (RB). A value of n may be, for example, 1, 2, 4, 8, or 16.

It should be further understood that the PTRS information in this embodiment of this application includes the frequency domain density or the frequency domain interval. For ease of description, in this embodiment of this application, only the frequency domain density is used as an example to describe the PTRS information. However, a case in which the PTRS information is the frequency domain interval also falls within protection of this embodiment of this application.

Optionally, before determining the resource block offset of the frequency domain position of the PTRS of the terminal device based on the PTRS information of the terminal device, the identifier of the terminal device, and the first bandwidth, the network device may obtain the PTRS information, the identifier of the terminal device, and the first bandwidth.

Optionally, the network device may obtain the identifier of the terminal device in a plurality of manners, and this is not limited in this embodiment of this application.

In an optional embodiment, when requesting to access a network of the network device, the terminal device may send an access request to the network device. The access request carries the identifier of the terminal device. The network device may receive the access request sent by the terminal device, and obtain the identifier of the terminal device from the access request.

In another optional embodiment, when requesting scheduling information from the network device, the terminal device may send a scheduling request to the network device. The scheduling request carries the identifier of the terminal device. The network device may receive the scheduling request from the terminal device, and obtain the identifier of the terminal device from the scheduling request.

Optionally, the identifier of the terminal device may include, for example, at least one of the following identifiers: a cell radio network temporary identifier (C-RNTI), a random access radio network temporary identifier (RA-RNTI), a temporary C-RNTI, and a transmit power control radio network temporary identifier (TPC-RNTI), and this is not limited in this embodiment of this application.

Optionally, the network device may obtain the first bandwidth in a plurality of manners, and this is not limited in this embodiment of this application.

In an optional embodiment, the network device may configure the first bandwidth for the terminal device.

Optionally, the network device may obtain the PTRS information of the terminal device in a plurality of manners, and this is not limited in this embodiment of this application.

In an optional embodiment, the network device may configure the PTRS information for the terminal device.

In another optional embodiment, the network device may determine the PTRS information of the terminal device based on the first bandwidth and a first mapping relationship.

The first mapping relationship is used to indicate a correspondence between the first bandwidth and the PTRS information.

Optionally, the network device and the terminal device may pre-agree on the first mapping relationship, or the network device may configure the first mapping relationship for the terminal device by using higher layer signaling.

Optionally, the network device may determine the resource block offset of the frequency domain position of the PTRS based on at least one of the PTRS information, the identifier of the terminal device, and the first bandwidth, and this is not limited in this embodiment of this application.

In an optional embodiment, the network device may determine the resource block offset of the frequency domain position of the PTRS based on the PTRS information and the identifier of the terminal device.

In another optional embodiment, the network device may determine the resource block offset of the frequency domain position of the PTRS based on the PTRS information, the identifier of the terminal device, and the first bandwidth.

In a possible implementation, the determining, by a network device, a resource block offset of a frequency domain position of a PTRS of a terminal device based on PTRS information of the terminal device, an identifier of the terminal device, and first bandwidth includes: when a ratio of the first bandwidth to the frequency domain density of the PTRS is less than or equal to a first preset value, or a ratio of the first bandwidth to the frequency domain interval of the PTRS is less than or equal to the first preset value, determining, by the network device, the resource block offset of the frequency domain position of the PTRS based on the PTRS information of the terminal device, the identifier of the terminal device, and the first bandwidth.

Optionally, that the network device determines the resource block offset based on the PTRS information, the identifier of the terminal device, and the first bandwidth may be that when a second condition is satisfied, the network device may determine the resource block offset based on the PTRS information, the identifier of the terminal device, and the first bandwidth.

Optionally, the second condition may be at least one of the following conditions:

(1) The ratio of the first bandwidth to the frequency domain density of the PTRS is less than or equal to a first threshold.

(2) A ratio of a minimum quantity of PTRSs to a maximum quantity of PTRSs is less than or equal to a second threshold.

(3) The ratio of the first bandwidth to the frequency domain density of the PTRS is a non-integer.

(4) A maximum quantity of PTRSs that can be mapped under the conditions of the PTRS information and the first bandwidth is less than or equal to a third threshold.

(5) A minimum quantity of PTRSs that can be mapped under the conditions of the PTRS information and the first bandwidth is less than or equal to a fourth threshold.

(6) The first bandwidth is less than or equal to a fifth threshold.

Optionally, one or more of the first threshold to the fifth threshold may be pre-agreed on by the network device and the terminal device, or may be configured by the network device for the terminal device by using first signaling, and this is not limited in this embodiment of this application.

Optionally, the first signaling may be radio resource control (RRC) signaling, Media Access Control (MAC) control element (CE) signaling, or downlink control information (DCI) signaling, and this is not limited in this embodiment of this application.

Optionally, the resource block offset of the frequency domain position of the PTRS may mean that an offset of the frequency domain position of the PTRS is measured in RBs, in other words, the offset of the frequency domain position of the PTRS is an RB-level offset.

It should be understood that the resource block offset of the frequency domain position of the PTRS may be understood as a resource block offset of a frequency domain position of the PTRS in a relative RB.

It should be further understood that the frequency domain position of the PTRS may be understood as a frequency domain position to which a PTRS symbol in a sequence of the PTRS is mapped.

It should be further understood that a quantity of PTRSs in this embodiment of this application may be understood as a quantity of PTRS symbols.

It should be further understood that when the network device allocates K physical resource blocks (PRB) to the terminal device, relative RBs whose sequence numbers (or numbers or indexes) are 0, 1, . . . , and K−1 may be obtained in ascending order of sequence numbers of the K PRBs, where K is an integer greater than 0. For example, the network device allocates four PRBs whose sequence numbers are 0, 1, 6, and 7 to the terminal device, and four relative RBs whose sequence numbers are 0, 1, 2, and 3 are obtained in ascending order of sequence numbers.

Optionally, the K physical resource blocks may be contiguous or noncontiguous, and this is not limited in this embodiment of this application.

It should be further understood that a frequency domain density N of a PTRS may mean that a frequency domain interval of the PTRS is N relative RBs. In this case, a $0^{th}$ PTRS symbol in a sequence of the PTRS corresponds to one of a $0^{th}$ relative RB to an $(N-1)^{th}$ relative RB, a first PTRS symbol corresponds to one of an $N^{th}$ relative RB to a $(2N-1)^{th}$ relative RB, and so on, to obtain a relative RB corresponding to each PTRS symbol in the sequence of the PTRS.

Specifically, a frequency domain position of an $M^{th}$ PTRS symbol in the sequence of the PTRS in a relative RB may be a $(\Delta f+M*N)^{th}$ relative RB, where $\Delta f$ indicates the resource block offset of the frequency domain position, N indicates the frequency domain density of the PTRS, and M is an integer greater than or equal to 0.

In a possible implementation, the determining, by a network device, a resource block offset of a frequency domain position of a PTRS of a terminal device based on PTRS information of the terminal device, an identifier of the terminal device, and first bandwidth includes: performing, by the network device, modulo processing on the first bandwidth based on the PTRS information, to obtain second bandwidth; and determining, by the network device, the resource block offset of the frequency domain position of the PTRS based on the second bandwidth and the identifier of the terminal device.

It should be understood that during determining of the resource block offset of the PTRS of the terminal device based on the identifier of the terminal device, the identifier of the terminal device may be mapped to the resource block offset of the PTRS by using a modulo method, and when the ratio of the bandwidth (the first bandwidth) scheduled by the network device for the terminal device to the frequency domain density of the PTRS is relatively small, a bandwidth remainder (the second bandwidth) may replace the original frequency domain density in a modulo formula for mapping the identifier of the terminal device to the resource block offset of the PTRS. A modular operation is provided to map a UE-ID to a RB-level offset. If a ratio of a scheduled bandwidth (BW) to the PTRS frequency density is small, the modular BW will replace the frequency density in the modular to map the UE-ID to the RB-level offset.

According to the reference signal transmission method provided in this embodiment of this application, the network device determines the resource block offset of the frequency domain position of the PTRS based on the second bandwidth and the identifier of the terminal device, so that a quantity of PTRSs mapped in the first bandwidth is the same as a quantity of PTRSs mapped when a frequency domain offset is 0. In this way, the following problem can be avoided: when the frequency domain offset is relatively large, the quantity of PTRSs mapped in the first bandwidth significantly decreases or is 0, and therefore the PTRS cannot be transmitted between the terminal device and the network device in the first bandwidth, and phase noise cannot be estimated based on the PTRS.

In a possible implementation, the transmission method further includes: when the ratio of the first bandwidth to the frequency domain density of the PTRS is greater than a second preset value, or the ratio of the first bandwidth to the frequency domain interval of the PTRS is greater than the second preset value, determining, by the network device, the resource block offset of the frequency domain position of the PTRS based on the PTRS information and the identifier of the terminal device.

It should be understood that the second preset value may be the same as the first preset value.

Optionally, that the network device determines the resource block offset of the frequency domain position of the PTRS based on the PTRS information and the identifier of the terminal device may be that when a first condition is satisfied, the network device determines the resource block offset of the frequency domain position of the PTRS based on the PTRS information and the identifier of the terminal device.

Optionally, the first condition may be at least one of the following conditions:

(1) The ratio of the first bandwidth to the frequency domain density of the PTRS is greater than a first threshold.

(2) A ratio of a minimum quantity of PTRSs to a maximum quantity of PTRSs is greater than a second threshold.

(3) The ratio of the first bandwidth to the frequency domain density of the PTRS is an integer.

(4) A maximum quantity of PTRSs that can be mapped under the conditions of the PTRS information and the first bandwidth is greater than a third threshold.

(5) A minimum quantity of PTRSs that can be mapped under the conditions of the PTRS information and the first bandwidth is greater than a fourth threshold.

(6) The first bandwidth is greater than a fifth threshold.

Optionally, one or more of the first threshold to the fifth threshold may be pre-agreed on by the network device and the terminal device, or may be configured by the network device for the terminal device by using first signaling, and this is not limited in this embodiment of this application.

Optionally, the first signaling may be RRC signaling, MAC CE signaling, or DCI signaling, and this is not limited in this embodiment of this application.

According to a second aspect, this application provides a reference signal transmission method, and the method includes:

determining, by a terminal device, a resource block offset of a frequency domain position of a phase tracking reference signal (PTRS) based on PTRS information, an identifier of the terminal device, and first bandwidth, where the PTRS information includes a frequency domain density or a frequency domain interval of the PTRS, and the first bandwidth is bandwidth scheduled by a network device for the terminal device; and performing, by the terminal device, transmission of the PTRS with the network device based on the resource block offset of the frequency domain position of the PTRS.

According to the reference signal transmission method provided in this embodiment of this application, the resource block offset of the frequency domain position of the PTRS of the terminal device is determined by using information related to the terminal device, to help randomize PTRS interference, thereby stabilizing performance of PTRS-based phase noise estimation.

Optionally, before determining the resource block offset of the frequency domain position of the PTRS based on the PTRS information, the identifier of the terminal device, and the first bandwidth, the terminal device may obtain the PTRS information, the identifier of the terminal device, and the first bandwidth.

Optionally, the identifier of the terminal device may include, for example, at least one of the following identifiers: a cell radio network temporary identifier (C-RNTI), a random access radio network temporary identifier (RA-RNTI), a temporary C-RNTI, and a transmit power control radio network temporary identifier (TPC-RNTI), and this is not limited in this embodiment of this application.

Optionally, the terminal device may generate the identifier.

Optionally, the terminal device may obtain the first bandwidth in a plurality of manners, and this is not limited in this embodiment of this application.

In an optional embodiment, the terminal device may receive first configuration information sent by the network device, and obtain the first bandwidth from the first configuration information.

Optionally, the terminal device may obtain the PTRS information of the terminal device in a plurality of manners, and this is not limited in this embodiment of this application.

In an optional embodiment, the terminal device may receive second configuration information sent by the network device, and obtain the PTRS information from the second configuration information.

In another optional embodiment, the terminal device may receive first configuration information sent by the network device, obtain the first bandwidth from the first configuration information, and determine the PTRS information of the terminal device based on the first bandwidth and a first mapping relationship. The first mapping relationship is used to indicate a correspondence between the first bandwidth and the PTRS information.

Optionally, the network device and the terminal device may pre-agree on the first mapping relationship, or the network device may configure the first mapping relationship for the terminal device by using higher layer signaling.

In a possible implementation, the determining, by a terminal device, a resource block offset of a frequency domain position of a PTRS based on PTRS information, an identifier of the terminal device, and first bandwidth includes: when a ratio of the first bandwidth to the frequency domain density of the PTRS is less than or equal to a first preset value, or a ratio of the first bandwidth to the frequency domain interval of the PTRS is less than or equal to the first preset value, determining, by the terminal device, the resource block offset of the frequency domain position of the PTRS based on the PTRS information, the identifier of the terminal device, and the first bandwidth.

In a possible implementation, the determining, by a terminal device, a resource block offset of a frequency domain position of a PTRS based on PTRS information, an identifier of the terminal device, and first bandwidth includes: performing, by the terminal device, modulo processing on the first bandwidth based on the PTRS information, to obtain second bandwidth; and determining, by the terminal device, the resource block offset of the frequency domain position of the PTRS based on the second bandwidth and the identifier of the terminal device.

In a possible implementation, the transmission method further includes: when the ratio of the first bandwidth to the frequency domain density of the PTRS is greater than a second preset value, or the ratio of the first bandwidth to the frequency domain interval of the PTRS is greater than the second preset value, determining, by the terminal device, the resource block offset of the frequency domain position of the PTRS based on the PTRS information and the identifier of the terminal device.

According to a third aspect, this application provides a reference signal transmission method, and the method includes:

determining, by a network device, a second frequency domain offset based on a first frequency domain offset and at least one subcarrier to which a demodulation reference signal (DMRS) of a terminal device is to be mapped in a first resource block, where the first resource block is a resource block to which a first PTRS of the terminal device is to be mapped, the first frequency domain offset is used to determine, from the first resource block, a frequency domain position of a resource element to which the first PTRS is to be mapped, and the second frequency domain offset is used to determine, from the at least one subcarrier, a frequency domain position to which the first PTRS is to be mapped;

determining, by the network device based on a frequency domain position of the at least one subcarrier and the second frequency domain offset, the frequency domain position to which the first PTRS is to be mapped; and performing, by the network device, transmission of the first PTRS with the terminal device based on the frequency domain position to which the first PTRS is to be mapped.

According to the reference signal transmission method provided in this embodiment of this application, the frequency domain position to which the first PTRS is to be mapped can be determined, based on the second frequency domain offset, from a subcarrier set occupied by a DMRS port associated with the first PTRS.

It should be understood that a relative offset (the second frequency domain offset) in a subcarrier set may be defined, and is used to indicate a subcarrier to which a PTRS is to be mapped in a given resource block (the first resource block). The subcarrier set includes a subcarrier occupied by a DMRS port associated with the PTRS, and includes no direct current subcarrier. A relative offset among the subcarrier set only includes the subcarrier occupied by the associated DMRS port, and does not include the direct current (DC) tone.

According to the reference signal transmission method provided in this embodiment of this application, because a DC subcarrier is removed from the subcarrier set occupied by the DMRS port associated with the first PTRS, the following problem can be avoided: the first PTRS is mapped to a frequency domain position on which the DC subcarrier is located, which causes a conflict between the PTRS and the DC subcarrier.

In a possible implementation, when both the frequency domain position to which the first PTRS is to be mapped and a frequency domain position to which a second PTRS of the terminal device is to be mapped are a first subcarrier in the at least one subcarrier, the performing, by the network device, transmission of the first PTRS with the terminal device based on the frequency domain position to which the first PTRS is to be mapped includes: determining, by the network device, a second subcarrier based on the first subcarrier, where the second subcarrier is a subcarrier spaced from the first subcarrier by a minimum quantity of subcarriers in the at least one subcarrier; and performing, by the network device, transmission of the first PTRS with the terminal device on the second subcarrier.

According to the reference signal transmission method provided in this embodiment of this application, when a frequency domain position of a resource element to which the first PTRS is to be mapped is the same as a frequency domain position of a resource element to which the second PTRS is to be mapped, the frequency domain position of the resource element to which the first PTRS is to be mapped or the frequency domain position of the resource element to which the second PTRS is to be mapped may be adjusted, so that the first PTRS and the second PTRS are mapped to two different subcarriers in the subcarrier set occupied by the DMRS port, and the two subcarriers have adjacent numbers or indexes in the subcarrier set, thereby avoiding mutual interference between the first PTRS and the second PTRS.

In a possible implementation, before the determining, by a network device, a second frequency domain offset based on a first frequency domain offset and at least one subcarrier to which a DMRS of a terminal device is to be mapped in a first resource block, the method further includes: obtaining, by the network device, reference information of the terminal device, where the reference information includes at least one of an identifier of the terminal device and scheduling information of the terminal device; and determining, by the network device, the first frequency domain offset based on the reference information of the terminal device.

In a possible implementation, the scheduling information of the terminal device includes at least one of the following information: scheduling information of the DMRS, scheduling information of the first PTRS, scheduling information of a sounding reference signal (SRS), and scheduling information of a codeword.

Optionally, the scheduling information of the DMRS may include at least one of a port number, a port quantity, a port pattern, a resource element mapping, a sequence scrambling index/number, and a subcarrier sequence number/resource element of the DMRS. The scheduling information of the first PTRS may include at least one of a port number, a port quantity, a frequency domain density, a resource element mapping, and a sequence scrambling index/number of the first PTRS. The scheduling information of the SRS may include at least one of a port number, a port quantity, a port pattern, a resource element mapping, a sequence scrambling index/number, and a subcarrier sequence number/resource element of the SRS. The scheduling information of the codeword may include a codeword number and/or a codeword quantity of the codeword.

According to a fourth aspect, this application provides a reference signal transmission method, and the method includes:

determining, by a terminal device, a second frequency domain offset based on a first frequency domain offset and at least one subcarrier to which a demodulation reference signal (DMRS) of the terminal device is to be mapped in a first resource block, where the first resource block is a resource block to which a first phase tracking reference signal (PTRS) is to be mapped, the first frequency domain offset is used to determine, from the first resource block, a frequency domain position of a resource element to which the first PTRS is to be mapped, and the second frequency domain offset is used to determine, from the at least one subcarrier, a frequency domain position to which the first PTRS is to be mapped;

determining, by the terminal device based on a frequency domain position of the at least one subcarrier and the second frequency domain offset, the frequency domain position to which the first PTRS is to be mapped; and performing, by the terminal device, transmission of the first PTRS with a network device based on the frequency domain position to which the first PTRS is to be mapped.

According to the reference signal transmission method provided in this embodiment of this application, the frequency domain position to which the first PTRS is to be mapped can be determined, based on the second frequency domain offset, from a subcarrier set occupied by a DMRS port associated with the first PTRS.

In a possible implementation, the at least one subcarrier includes no direct current subcarrier.

In a possible implementation, when both the frequency domain position to which the first PTRS is to be mapped and a frequency domain position to which a second PTRS of the terminal device is to be mapped are a first subcarrier in the at least one subcarrier, the performing, by the terminal device, transmission of the first PTRS with a network device based on the frequency domain position to which the first PTRS is to be mapped includes: determining, by the terminal device, a second subcarrier based on the first subcarrier, where the second subcarrier is a subcarrier spaced from the first subcarrier by a minimum quantity of subcarriers in the at least one subcarrier; and performing, by the terminal device, transmission of the first PTRS with the network device on the second subcarrier.

In a possible implementation, before the determining, by a terminal device, a second frequency domain offset based on a first frequency domain offset and at least one subcarrier to which a DMRS of the terminal device is to be mapped in a first resource block, the method further includes: obtaining, by the terminal device, reference information of the terminal device, where the reference information includes at least one of an identifier of the terminal device and scheduling information of the terminal device; and determining, by the terminal device, the first frequency domain offset based on the reference information of the terminal device.

In a possible implementation, the scheduling information of the terminal device includes at least one of the following information: scheduling information of the DMRS, scheduling information of the first PTRS, scheduling information of a sounding reference signal (SRS), and scheduling information of a codeword.

According to a fifth aspect, this application provides a reference signal transmission apparatus, configured to perform the transmission method according to any one of the first aspect and the possible implementations of the first aspect.

According to a sixth aspect, this application provides a reference signal transmission apparatus, configured to perform the transmission method according to any one of the second aspect and the possible implementations of the second aspect.

According to a seventh aspect, this application provides a reference signal transmission apparatus, configured to perform the transmission method according to any one of the third aspect and the possible implementations of the third aspect.

According to an eighth aspect, this application provides a reference signal transmission apparatus, configured to perform the transmission method according to any one of the fourth aspect and the possible implementations of the third aspect.

According to a ninth aspect, this application provides a reference signal transmission apparatus, the transmission apparatus includes a memory, a processor, a transceiver, and a computer program that is stored in the memory and that may run on the processor, and when executing the computer program, the processor performs the transmission method according to any one of the first aspect and the possible implementations of the first aspect.

According to a tenth aspect, this application provides a reference signal transmission apparatus, the transmission apparatus includes a memory, a processor, a transceiver, and a computer program that is stored in the memory and that may run on the processor, and when executing the computer program, the processor performs the transmission method according to any one of the second aspect and the possible implementations of the second aspect.

According to an eleventh aspect, this application provides a reference signal transmission apparatus, the transmission apparatus includes a memory, a processor, a transceiver, and a computer program that is stored in the memory and that may run on the processor, and when executing the computer program, the processor performs the transmission method according to any one of the third aspect and the possible implementations of the third aspect.

According to a twelfth aspect, this application provides a reference signal transmission apparatus, the transmission apparatus includes a memory, a processor, a transceiver, and a computer program that is stored in the memory and that may run on the processor, and when executing the computer program, the processor performs the transmission method according to any one of the fourth aspect and the possible implementations of the fourth aspect.

According to a thirteenth aspect, this application provides a computer readable medium, configured to store a computer program, where the computer program includes an instruction used to perform the transmission method according to any one of the first aspect and the possible implementations of the first aspect.

According to a fourteenth aspect, this application provides a computer readable medium, configured to store a computer program, where the computer program includes an instruction used to perform the transmission method according to any one of the second aspect and the possible implementations of the second aspect.

According to a fifteenth aspect, this application provides a computer readable medium, configured to store a computer program, where the computer program includes an instruction used to perform the transmission method according to any one of the third aspect and the possible implementations of the third aspect.

According to a sixteenth aspect, this application provides a computer readable medium, configured to store a computer program, where the computer program includes an instruction used to perform the transmission method according to any one of the fourth aspect and the possible implementations of the fourth aspect.

According to a seventeenth aspect, this application provides a computer program product including an instruction, where when the computer program product runs on a computer, the computer performs the transmission method according to any one of the first aspect and the possible implementations of the first aspect.

According to an eighteenth aspect, this application provides a computer program product including an instruction, where when the computer program product runs on a computer, the computer performs the transmission method according to any one of the second aspect and the possible implementations of the second aspect.

According to a nineteenth aspect, this application provides a computer program product including an instruction, where when the computer program product runs on a computer, the computer performs the transmission method according to any one of the third aspect and the possible implementations of the third aspect.

According to a twentieth aspect, this application provides a computer program product including an instruction, where when the computer program product runs on a computer, the computer performs the transmission method according to any one of the fourth aspect and the possible implementations of the fourth aspect.

According to a twenty-first aspect, this application provides a communications chip, where an instruction is stored in the communications chip, and when the instruction runs on a network device or a terminal device, the network device or the terminal device performs the method according to the foregoing aspects.

DESCRIPTION OF EMBODIMENTS

The following describes the technical solutions in this application with reference to the accompanying drawings.

It should be understood that the technical solutions in embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a wireless local area network (WLAN), or a future fifth generation (5G) wireless communications system.

Figure 1:
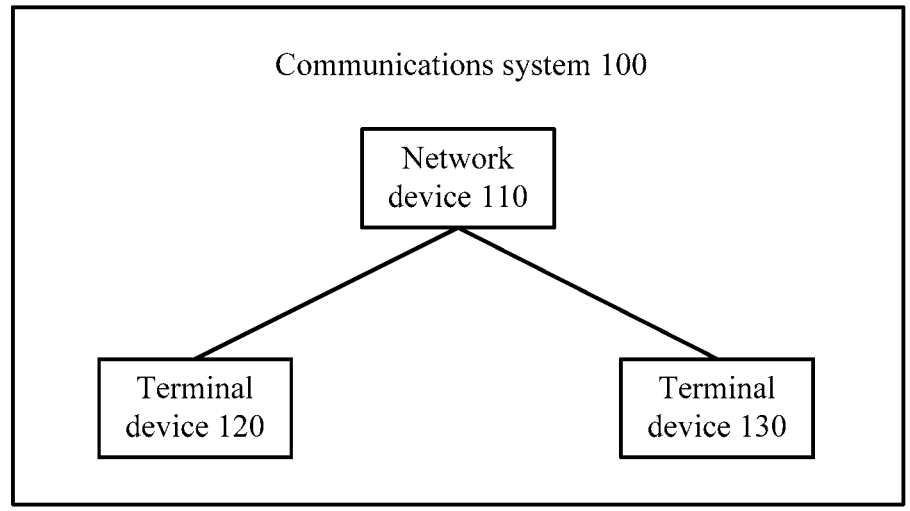
FIG. 1 is a schematic block diagram of a communications system according to an embodiment of this application.

FIG. 1 is a schematic architectural diagram of a communications system 100 according to an embodiment of this application. As shown in FIG. 1, the communications system 100 may include at least one network device (a network device 110 shown in FIG. 1) and a plurality of terminal devices (a terminal device 120 and a terminal device 130 shown in FIG. 1), and the at least one network device and the plurality of terminal devices may perform wireless communication with each other.

Optionally, the network device may provide communication coverage for a specific geographic area, and may communicate with a UE that falls within the coverage. The network device may be: a base transceiver station (BTS) in a GSM system or a CDMA system, a NodeB (NB) in a WCDMA system, an evolved NodeB (eNB or eNodeB) in an LTE system, or a radio controller in a cloud radio access network (CRAN). Alternatively, the network device may be: a network device in a core network, a relay station, an access point, a vehicular device, a wearable device, a network device in a future 5G network, an NR network, or a future evolved public land mobile network (PLMN), or the like.

Optionally, the terminal device may be mobile or fixed. The terminal device may be an access terminal, a user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be: a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicular device, a wearable device, a terminal device in a future 5G network, an NR network, or a future evolved PLMN, or the like.

FIG. 1 shows one network device and two terminal devices as an example. Optionally, the communications system 100 may further include a plurality of network devices, and coverage of each network device may include another quantity of terminal devices. This is not limited in this embodiment of this application. Optionally, the communications system 100 may further include other network entities such as a network controller and a mobility management entity, and this is not limited in this embodiment of this application.

It should be understood that the network device or the terminal device may estimate phase noise based on a PTRS, or may estimate phase noise based on a phase compensation reference signal (PCRS). For consistency of description, the PTRS and the PCRS are collectively referred to as a PTRS in this embodiment of this application, and this is not limited in this embodiment of this application.

It should be understood that a frequency domain density (a frequency domain interval) n of a PTRS may mean that a PTRS symbol is mapped to one in every n resource blocks (RB). A value of n may be, for example, 1, 2, 4, 8, or 16.

It should be further understood that PTRS information in this embodiment of this application includes the frequency domain density or the frequency domain interval. For ease of description, in this embodiment of this application, only the frequency domain density is used as an example to describe the PTRS information. However, a case in which the PTRS information is the frequency domain interval also falls within protection of this embodiment of this application.

In the prior art, a network device and a terminal device may transmit a PTRS by using a port 60 and/or a port 61. An offset that is of a frequency domain position of a PTRS and that is corresponding to the port 60 is 23 subcarriers, and an offset that is of the frequency domain position of the PTRS and that is corresponding to the port 61 is 24 subcarriers.

Figure 2:
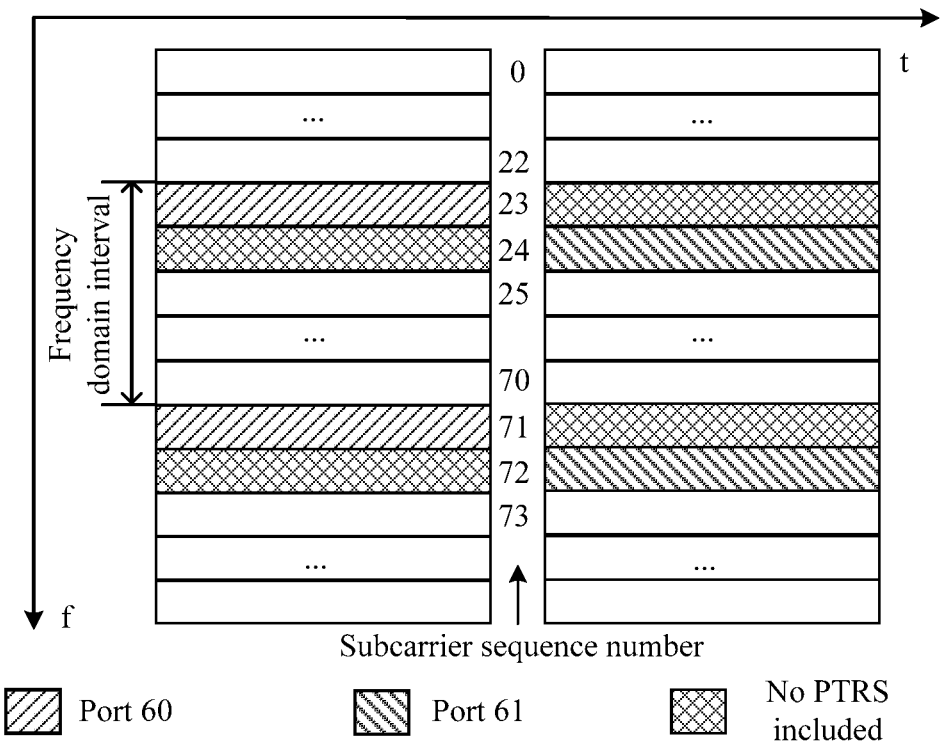
FIG. 2 is a schematic diagram of a frequency domain position to which a PTRS is mapped in the prior art.

For example, as shown in FIG. 2, a frequency domain interval of a PTRS is 4 RBs (48 subcarriers) when a frequency domain density of the PTRS is 4 and each RB includes 12 subcarriers. In this case, when the network device and the terminal device transmit a PTRS by using the port 60, the PTRS is successively mapped to subcarriers whose sequence numbers are 23, 23+1*48, 23+2*48, . . . , and 23+m*48; when the network device and the terminal device transmit a PTRS by using the port 61, the PTRS is successively mapped to subcarriers whose sequence numbers are 24, 24+1*48, 24+2*48, . . . , and 24+m*48, where m is an integer greater than or equal to 0.

In the prior art, when PTRS sequences of a first terminal device and a second terminal device in one cell/sector are the same, and both the first terminal device and the second terminal device transmit a PTRS by using a same port, a frequency domain position to which a PTRS of the first terminal device is mapped coincides with a frequency domain position to which a PTRS of the second terminal device is mapped. In this case, PTRS signals received by the first terminal device and the second terminal device on a same subcarrier interfere with each other. Therefore, performance of PTRS-based phase noise estimation is unstable, and PTRS interference needs to be randomized to stabilize performance of phase noise estimation that is based on a PTRS of each terminal device.

According to a reference signal transmission method provided in the embodiments of this application, a network device determines a resource block offset of a frequency domain position of a PTRS based on PTRS information of a terminal device, an identifier of the terminal device, and first bandwidth, where the PTRS information includes a frequency domain density or a frequency domain interval of the PTRS, and the first bandwidth is bandwidth scheduled by the network device for the terminal device; and the network device performs transmission of the PTRS with the terminal device based on the resource block offset of the frequency domain position of the PTRS. According to the reference signal transmission method provided in the embodiments of this application, the resource block offset of the frequency domain position of the PTRS of the terminal device is determined by using information related to the terminal device, to help randomize PTRS interference, thereby stabilizing performance of PTRS-based phase noise estimation.

Figure 3:
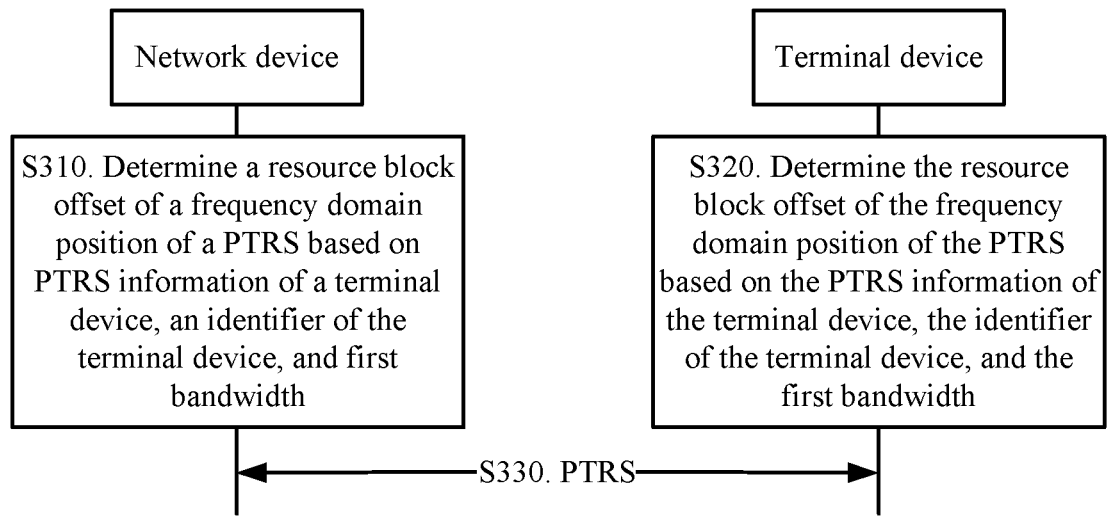
FIG. 3 is a schematic flowchart of a reference signal transmission method according to an embodiment of this application.

FIG. 3 is a schematic flowchart of a reference signal transmission method 300 according to an embodiment of this application. The transmission method 300 may be applied to the communications system 100 shown in FIG. 1.

S310. During S310, a network device determines a resource block offset of a frequency domain position of a PTRS of a terminal device based on PTRS information of the terminal device, an identifier of the terminal device, and first bandwidth, where the PTRS information includes a frequency domain density or a frequency domain interval of the PTRS, and the first bandwidth is bandwidth scheduled by the network device for the terminal device.

Optionally, before S310, the network device may obtain the PTRS information, the identifier of the terminal device, and the first bandwidth.

Optionally, the network device may obtain the identifier of the terminal device in a plurality of manners, and this is not limited in this embodiment of this application.

In an optional embodiment, when requesting to access a network of the network device, the terminal device may send an access request to the network device. The access request carries the identifier of the terminal device. The network device may receive the access request sent by the terminal device, and obtain the identifier of the terminal device from the access request.

In another optional embodiment, when requesting scheduling information from the network device, the terminal device may send a scheduling request to the network device. The scheduling request carries the identifier of the terminal device. The network device may receive the scheduling request from the terminal device, and obtain the identifier of the terminal device from the scheduling request.

Optionally, the identifier of the terminal device may include, for example, at least one of the following identifiers: a cell radio network temporary identifier (C-RNTI), a random access radio network temporary identifier (RA-RNTI), a temporary C-RNTI, and a transmit power control radio network temporary identifier (TPC-RNTI), and this is not limited in this embodiment of this application.

Optionally, the network device may obtain the first bandwidth in a plurality of manners, and this is not limited in this embodiment of this application.

In an optional embodiment, the network device may configure the first bandwidth for the terminal device.

Optionally, the network device may obtain the PTRS information of the terminal device in a plurality of manners, and this is not limited in this embodiment of this application.

In an optional embodiment, the network device may configure the PTRS information for the terminal device.

In another optional embodiment, the network device may determine the PTRS information of the terminal device based on the first bandwidth and a first mapping relationship. The first mapping relationship is used to indicate a correspondence between the first bandwidth and the PTRS information.

Optionally, the network device and the terminal device may pre-agree on the first mapping relationship, or the network device may configure the first mapping relationship for the terminal device by using higher layer signaling.

For example, the network device and the terminal device may pre-agree that, the PTRS is not to be mapped when a value of the first bandwidth is less than a first preset value; the frequency domain density of the PTRS is 1 (the frequency domain interval is one RB) when the value of the first bandwidth is greater than or equal to the first preset value and less than a second preset value; the frequency domain density of the PTRS is 2 when the value of the first bandwidth is greater than or equal to the second preset value and less than a third preset value; the frequency domain density of the PTRS is 4 when the value of the first bandwidth is greater than or equal to the third preset value and less than a fourth preset value; the frequency domain density of the PTRS is 8 when the value of the first bandwidth is greater than or equal to the fourth preset value; and so on. The first preset value, the second preset value, the third preset value, and the fourth preset value are in ascending order.

Optionally, in S310, the resource block offset of the frequency domain position of the PTRS may mean that an offset of the frequency domain position of the PTRS is measured in RBs, in other words, the offset of the frequency domain position of the PTRS is an RB-level offset.

It should be further understood that the resource block offset of the frequency domain position of the PTRS may be understood as a resource block offset of a frequency domain position of the PTRS in a relative RB.

It should be further understood that the frequency domain position of the PTRS may be understood as a frequency domain position to which a PTRS symbol in a sequence of the PTRS is mapped.

It should be further understood that when the network device allocates K physical resource blocks (PRB) to the terminal device, relative RBs whose sequence numbers (or numbers or indexes) are $0, 1, \ldots$, and $K-1$ may be obtained in ascending order of sequence numbers of the K PRBs, where K is an integer greater than 0. For example, the network device allocates four PRBs whose sequence numbers are 0, 1, 6, and 7 to the terminal device, and four relative RBs whose sequence numbers are 0, 1, 2, and 3 are obtained in ascending order of sequence numbers.

Optionally, the K physical resource blocks may be contiguous or noncontiguous, and this is not limited in this embodiment of this application.

It should be further understood that a frequency domain density N of a PTRS may mean that a frequency domain interval of the PTRS is N relative RBs. In this case, a $0^{th}$ PTRS symbol in a sequence of the PTRS corresponds to one of a $0^{th}$ relative RB to an $(N-1)^{th}$ relative RB, a first PTRS symbol corresponds to one of an $N^{th}$ relative RB to a $(2N-1)^{th}$ relative RB, and so on, to obtain a relative RB corresponding to each PTRS symbol in the sequence of the PTRS.

Specifically, a frequency domain position of an $M^{th}$ PTRS symbol in the sequence of the PTRS in a relative RB may be a $(\Delta f + M*N)^{th}$ relative RB, where $\Delta f$ indicates the resource block offset of the frequency domain position, N indicates the frequency domain density of the PTRS, and M is an integer greater than or equal to 0.

Optionally, the network device may determine the resource block offset of the frequency domain position of the PTRS based on at least one of the PTRS information, the identifier of the terminal device, and the first bandwidth, and this is not limited in this embodiment of this application.

In an optional embodiment, the network device may determine the resource block offset of the frequency domain position of the PTRS based on the frequency domain density of the PTRS and the identifier of the terminal device.

Optionally, when the frequency domain interval of the PTRS is $FD_{step}$ and the identifier (ID) of the terminal device is $ID_{UE}$, the network device determines the resource block offset $\Delta f$ in the following manners:

Manner 1: $\Delta f = \mathrm{mod}(ID_{UE}, FD_{step})$, where a value range of $\Delta f$ is $\{0, 1, \ldots, FD_{step}-1\}$ (For RB-level offset, the value can't exceed the frequency interval between two adjacent PTRS, which is $FD_{step}$ if frequency density is every $FD_{step}$th RB, and modular operation can be introduced to derive the RB-level offset from $ID_{UE}$, illustrated as: $\Delta f = \mathrm{mod}(ID_{UE}, FD_{step})$).

Manner 2: $\Delta f = ID_{UE}\{b_0, b_1, b_2, \ldots, b_{L-1}\}$, where a value range of $\Delta f$ is $\{0, 1, \ldots, FD_{step}-1\}$, $ID_{UE}\{b_0, b_1, b_2, \ldots, b_{L-1}\}$ indicates that a bit $b_i$ in $ID_{UE}$ is used to determine the resource block offset, $i = \{0, 1, 2, \ldots, L-1\}$, in other words, there are a total of L bits, $L = \mathrm{ceil}(\log_2^{FD_{step}})$, and the L bits are in descending order of bit significance from left to right.

Optionally, when $2^L > FD_{step}$, $\Delta f = \mathrm{mod}(ID_{UE}\{b_0, b_1, b_2, \ldots, b_{L-1}\}, FD_{step})$, where $\mathrm{ceil}(\bullet)$ indicates rounding up.

However, in some special scenarios, some improper resource block offsets may be determined by the network device based on the PTRS information and the identifier of the terminal device. Consequently, a relatively small quantity of PTRSs are mapped in the bandwidth scheduled by the network device for the terminal device, and even a case in which no PTRS is mapped in the first bandwidth may occur, thereby affecting phase noise estimation.

It should be understood that a quantity of PTRSs in this embodiment of this application may be understood as a quantity of PTRS symbols.

For example, assuming that the frequency domain interval of the PTRS is 4, the resource block offset may be 0 RBs, one RB, two RBs, or three RBs. When the first bandwidth is relatively small, the following problem may exist:

When the first bandwidth is two RBs, if the resource block offset is 0 RBs or one RB, a maximum quantity 1 of PTRSs are mapped in the first bandwidth; or if the resource block offset is three RBs or four RBs, a minimum quantity 0 of PTRSs are mapped in the first bandwidth. In other words, if the first bandwidth is two RBs, no PTRS is mapped in the two RBs when the resource block offset is relatively large.

When the first bandwidth is six RBs, if the resource block offset is 0 RBs or one RB, a maximum quantity 2 of PTRSs are mapped in the first bandwidth; or if the resource block offset is three RBs or four RBs, a minimum quantity 1 of PTRSs are mapped in the first bandwidth. In other words, if the first bandwidth is six RBs, a quantity of PTRSs is reduced by half when the resource block offset is relatively large.

In other words, under some conditions, for example, when the resource block offset is relatively small, a quantity of PTRSs mapped in the first bandwidth is relatively large; however, under some other conditions, for example, when the resource block offset is relatively large, a quantity of PTRSs mapped in the first bandwidth may be less than a quantity of PTRSs mapped in the first bandwidth when the resource block offset is 0 RBs, and the quantity of PTRSs may be even 0.

In another optional embodiment, that the network device determines the resource block offset of the frequency domain position of the PTRS based on the PTRS information and the identifier of the terminal device may be that when a first condition is satisfied, the network device determines the resource block offset of the frequency domain position of the PTRS based on the PTRS information and the identifier of the terminal device.

Optionally, the first condition may be at least one of the following conditions:

(1) A ratio of the first bandwidth to the frequency domain density of the PTRS is greater than a first threshold.

(2) A ratio of a minimum quantity of PTRSs to a maximum quantity of PTRSs is greater than a second threshold.

(3) The ratio of the first bandwidth to the frequency domain density of the PTRS is an integer.

(4) A maximum quantity of PTRSs that can be mapped under the conditions of the PTRS information and the first bandwidth is greater than a third threshold.

(5) A minimum quantity of PTRSs that can be mapped under the conditions of the PTRS information and the first bandwidth is greater than a fourth threshold.

(6) The first bandwidth is greater than a fifth threshold.

When the first condition is not satisfied, a quantity of PTRSs mapped in the first bandwidth may significantly decrease.

Optionally, in S310, that the network device determines the resource block offset based on the PTRS information, the identifier of the terminal device, and the first bandwidth may be that when a second condition is satisfied, the network device may determine the resource block offset based on the PTRS information, the identifier of the terminal device, and the first bandwidth.

Optionally, the second condition may be at least one of the following conditions:

(1) A ratio of the first bandwidth to the frequency domain density of the PTRS is less than or equal to a first threshold.

(2) A ratio of a minimum quantity of PTRSs to a maximum quantity of PTRSs is less than or equal to a second threshold.

(3) The ratio of the first bandwidth to the frequency domain density of the PTRS is a non-integer.

(4) A maximum quantity of PTRSs that can be mapped under the conditions of the PTRS information and the first bandwidth is less than or equal to a third threshold.

(5) A minimum quantity of PTRSs that can be mapped under the conditions of the PTRS information and the first bandwidth is less than or equal to a fourth threshold.

(6) The first bandwidth is less than or equal to a fifth threshold.

Optionally, one or more of the first threshold to the fifth threshold may be pre-agreed on by the network device and the terminal device, or may be configured by the network device for the terminal device by using first signaling, and this is not limited in this embodiment of this application.

Optionally, the first signaling may be radio resource control (RRC) signaling, Media Access Control (MAC) control element (CE) signaling, or downlink control information (DCI) signaling, and this is not limited in this embodiment of this application.

In an optional embodiment, when the second condition is satisfied, the network device may determine second bandwidth based on the PTRS information and the first bandwidth, and determine the resource block offset based on the second bandwidth and the identifier of the terminal device.

Optionally, when the frequency domain interval of the PTRS is $FD_{step}$ and the first bandwidth is $BW_1$, the network device may determine the second bandwidth $BW_2$ in the following manners:

Manner 1: $BW_2 = mod(BW_1, FD_{step})$, where mod(•) indicates a modulo operation.

Manner 2: $BW_2 = BW_1 - (N_{max}-1)*FD_{step}$, where $N_{max}$ is a maximum quantity of PTRSs that can be mapped in the first bandwidth, namely, a quantity of PTRSs that can be mapped when the offset is 0 RBs.

For example, when the first bandwidth is six RBs and the frequency domain interval is four RBs, the second bandwidth is two RBs.

Optionally, when the second bandwidth is $BW_2$ and the identifier of the terminal device is $ID_{UE}$, the network device may determine the resource block offset $\Delta f$ in the following manners, where a value range of $\Delta f$ is $\{0, 1, 2, \ldots, BW_2-1\}$:

Manner 1: $\Delta f = mod(ID_{UE}, BW_2)$.

For example, when the first bandwidth is two RBs and the frequency domain interval is four RBs, if the second bandwidth is two RBs, a resource block offset of a terminal device whose $ID_{UE}$ equals to 0 is 0 RBs, a resource block offset of a terminal device whose $ID_{UE}$ equals to 1 is one RB, a resource block offset of a terminal device whose $ID_{UE}$ equals to 2 is 0 RBs, and a resource block offset of a terminal device whose $ID_{UE}$ equals to 3 is one RB.

By considering the value of $FD_{step}$ is limited to 2 or 4, integer power of 2, L bits of IDUE can be extracted to express the offset, where L equals to the log $2(FD_{step})$.

According to the previous methods, for a same scheduled $BW_1$, the number of PTRS for different UE may be different on some scenarios, e.g., if frequency density is every 4th RB, and scheduled $BW_1$ is 6RB, then the number of PTRS can be 1 or 2, leading a large difference among users. Additional limitation on the offset can be introduces, such as replace the "frequency density $FD_{step}$" in Equation 1 ($\Delta f = mod(ID_{UE}, FD_{step})$) to modular $BW_2$, satisfy the equation $BW_2 = mod(BW_1, FD_{step})$.

Manner 2: $\Delta f = mod(mod(ID_{UE}, FD_{step}), BW_2)$.

For example, when the first bandwidth is two RBs and the frequency domain interval is four RBs, if the second bandwidth is two RBs, a resource block offset of a terminal device whose $ID_{UE}$ equals to 0 is 0 RBs, a resource block offset of a terminal device whose $ID_{UE}$ equals to 1 is one RB, a resource block offset of a terminal device whose $ID_{UE}$ equals to 2 is 0 RBs, and a resource block offset of a terminal device whose $ID_{UE}$ equals to 3 is one RB.

Manner 3: $\Delta f = min(mod(ID_{UE}, FD_{step}), BW_2-1)$, where min(•) indicates obtaining a minimum value.

For example, when the first bandwidth is two RBs and the frequency domain interval is four RBs, if the second bandwidth is two RBs, a resource block offset of a terminal device whose $ID_{UE}$ equals to 0 is 0 RBs, a resource block offset of a terminal device whose $ID_{UE}$ equals to 1 is one RB, a resource block offset of a terminal device whose $ID_{UE}$ equals to 2 is one RB, and a resource block offset of a terminal device whose $ID_{UE}$ equals to 3 is one RB.

Manner 4: $\Delta f = ID_{UE}\{b_0, b_1, \ldots, b_{L-1}\}$, where $ID_{UE}\{b_0, b_1, \ldots, b_{L-1}\}$ indicates that a bit $b_i$ in $ID_{UE}$ is used to determine the offset, $i=\{0, 1, 2 \ldots, L-1\}$, in other words, there are a total of L bits, and the L bits are in descending order of bit significance from left to right.

Optionally, when $2^L > BW_2$, $\Delta f = mod(ID_{UE}\{b_0, b_1, \ldots, B_{L-1}\}, BW_2)$, where ceil(•) indicates rounding up.

For example, when the first bandwidth is two RBs and the frequency domain interval is four RBs, the second bandwidth is two RBs, and L=1, that is, $ID_{UE}\{b_0\}$.

Optionally, when $b_0=0$, that is, a bit 0 (a least significant bit) in $ID_{UE}$ is used to determine the offset, a resource block offset of a terminal device whose $ID_{UE}$ equals to 0 is 0 RBs, a resource block offset of a terminal device whose $ID_{UE}$ equals to 1 is one RB, a resource block offset of a terminal device whose $ID_{UE}$ equals to 2 is 0 RBs, and a resource block offset of a terminal device whose $ID_{UE}$ equals to 3 is one RB. Optionally, when $b_0=1$, that is, a bit 1 (a second bit) in $ID_{UE}$ is used to determine the offset, a resource block offset of a terminal device whose $ID_{UE}$ equals to 0 is 0 RBs, a resource block offset of a terminal device whose $ID_{UE}$ equals to 1 is 0 RBs, a resource block offset of a terminal device whose $ID_{UE}$ equals to 2 is one RB, and a resource block offset of a terminal device whose $ID_{UE}$ equals to 3 is one RB.

However, if the network device determines the resource block offset based on only the frequency domain interval and the identifier of the terminal device when the second condition is satisfied, when the frequency domain interval is four RBs, a resource block offset of a terminal device whose $ID_{UE}$ equals to 0 is 0 RBs, a resource block offset of a terminal device whose $ID_{UE}$ equals to 1 is one RB, a resource block offset of a terminal device whose $ID_{UE}$ equals to 2 is two RBs, and a resource block offset of a terminal device whose $ID_{UE}$ equals to 3 is three RBs.

Because the first bandwidth is only two RBs, the network device cannot perform, in the first bandwidth, transmission of a PTRS with the terminal device whose $ID_{UE}$ equals to 2 or the terminal device whose $ID_{UE}$ equals to 3, and therefore the network device and the two terminal devices cannot perform noise estimation based on received PTRSs.

According to the reference signal transmission method provided in this embodiment of this application, when the second condition is satisfied, the network device determines the resource block offset based on the PTRS information, the first bandwidth, and the identifier of the terminal device, so that under the second condition, the network device and each terminal device can transmit PTRSs, and perform noise estimation based on received PTRSs.

It should be understood that during the determining of the resource block offset of the PTRS of the terminal device based on the identifier of the terminal device, the identifier of the terminal device may be mapped to the resource block offset of the PTRS by using a modulo method, and when a ratio of the bandwidth (the first bandwidth) scheduled by the network device for the terminal device to the frequency domain density of the PTRS is relatively small, a bandwidth remainder (the second bandwidth) may replace the original frequency domain density in a modulo formula for mapping the identifier of the terminal device to the resource block offset of the PTRS. A modular operation is provided to map the UE-ID to the RB-level offset. If the ratio of the scheduled BW to the PTRS frequency density is small, the modular BW will replace the frequency density in the modular to map the UE-ID to the RB-level offset.

Optionally, when the network device determines $BW_2$ in Manner 2, when the first condition is satisfied, the network device may determine the resource block offset of the frequency domain position of the PTRS based on the second bandwidth and the identifier of the terminal device.

Optionally, the network device may determine, in a plurality of manners, a maximum quantity of PTRSs or a minimum quantity of PTRSs that can be mapped under the conditions of the PTRS information and the first bandwidth, and this is not limited in this embodiment of this application.

In an optional embodiment, the network device may determine the maximum quantity of PTRSs based on the first bandwidth, the frequency domain density (the frequency domain interval) of the PTRS, and a smallest resource block offset, where the smallest resource block offset is 0 when the frequency domain interval of the PTRS is $FD_{step}$.

In another optional embodiment, the network device may determine the minimum quantity of PTRSs based on the first bandwidth, the frequency domain density (the frequency domain interval) of the PTRS, and a largest resource block offset, where the largest resource block offset is $FD_{step}-1$ when the frequency domain interval of the PTRS is $FD_{step}$.

For example, when the first bandwidth is eight RBs and the frequency domain density of the PTRS is that a PTRS symbol is mapped to one in every four RBs, a value range of the resource block offset is $\{0, 1, 2, 3\}$. It can be determined, based on the smallest resource block offset 0 RBs, that a maximum quantity of PTRSs that can be mapped in the eight RBs is 2 (in other words, PTRSs are mapped to a $0^{th}$ RB and a fourth RB), and it can be determined, based on the largest resource block offset three RBs, that a minimum quantity of PTRSs that can be mapped in the eight RBs is 2 (in other words, PTRSs are mapped to a third RB and a seventh RB).

For another example, when the first bandwidth is six RBs and the frequency domain density of the PTRS is that a PTRS symbol is mapped to one in every four RBs, a value range of the resource block offset is $\{0, 1, 2, 3\}$. It can be determined, based on the smallest resource block offset 0 RBs, that a maximum quantity of PTRSs that can be mapped in the six RBs is 2 (in other words, PTRSs are mapped to a $0^{th}$ RB and a fourth RB), and it can be determined, based on the largest resource block offset three RBs, that a minimum quantity of PTRSs that can be mapped in the six RBs is 1 (in other words, a PTRS is mapped to the $3^{th}$ RB).

S320. During S320, the terminal device determines the resource block offset of the frequency domain position of the PTRS based on the PTRS information, the identifier of the terminal device, and the first bandwidth.

It should be understood that there is no order for performing S310 and S320.

Optionally, before S320, the terminal device may obtain the PTRS information, the identifier of the terminal device, and the first bandwidth.

Optionally, the identifier of the terminal device may include, for example, at least one of the following identifiers: a cell radio network temporary identifier (C-RNTI), a random access radio network temporary identifier (RA-RNTI), a temporary C-RNTI, and a transmit power control radio network temporary identifier (TPC-RNTI), and this is not limited in this embodiment of this application.

Optionally, the terminal device may generate the identifier.

Optionally, the terminal device may obtain the first bandwidth in a plurality of manners, and this is not limited in this embodiment of this application.

In an optional embodiment, the terminal device may receive first configuration information sent by the network device, and obtain the first bandwidth from the first configuration information.

Optionally, the terminal device may obtain the PTRS information of the terminal device in a plurality of manners, and this is not limited in this embodiment of this application.

In an optional embodiment, the terminal device may receive second configuration information sent by the network device, and obtain the PTRS information from the second configuration information.

In another optional embodiment, the terminal device may receive first configuration information sent by the network device, obtain the first bandwidth from the first configuration information, and determine the PTRS information of the terminal device based on the first bandwidth and a first mapping relationship. The first mapping relationship is used to indicate a correspondence between the first bandwidth and the PTRS information.

Optionally, the network device and the terminal device may pre-agree on the first mapping relationship, or the network device may configure the first mapping relationship for the terminal device by using higher layer signaling.

For example, the network device and the terminal device may pre-agree that, the PTRS is not to be mapped when a value of the first bandwidth is less than a first preset value; the frequency domain density of the PTRS is 1 (the frequency domain interval is one RB) when the value of the first bandwidth is greater than or equal to the first preset value and less than a second preset value; the frequency domain density of the PTRS is 2 when the value of the first bandwidth is greater than or equal to the second preset value and less than a third preset value; the frequency domain density of the PTRS is 4 when the value of the first bandwidth is greater than or equal to the third preset value and less than a fourth preset value; the frequency domain density of the PTRS is 8 when the value of the first bandwidth is greater than or equal to the fourth preset value; and so on. The first preset value, the second preset value, the third preset value, and the fourth preset value are in ascending order.

S330. During S330, the network device performs transmission of the PTRS with the terminal device based on the resource block offset of the frequency domain position of the PTRS, and correspondingly, the terminal device performs transmission of the PTRS with the network device based on the resource block offset of the frequency domain position of the PTRS.

Optionally, S330 may be that the network device determines, based on the resource block offset of the frequency domain position of the PTRS, a frequency domain position of a relative RB to which the PTRS is to be mapped, determines, based on the frequency domain position of the relative RB to which the PTRS is to be mapped, a frequency domain position of a PRB to which the PTRS is to be mapped, and performs transmission of the PTRS with the terminal device on the frequency domain position of the PRB to which the PTRS is to be mapped.

Correspondingly, the terminal device determines, based on the resource block offset of the frequency domain position of the PTRS, the frequency domain position of the relative RB to which the PTRS is to be mapped, determines, based on the frequency domain position of the relative RB to which the PTRS is to be mapped, the frequency domain position of the PRB to which the PTRS is to be mapped, and performs transmission of the PTRS with the network device on the frequency domain position of the PRB to which the PTRS is to be mapped.

The following uses the network device as an example to describe how the network device determines, based on the resource block offset of the frequency domain position of the PTRS, the frequency domain position of the PRB to which the PTRS is to be mapped.

Figure 4:
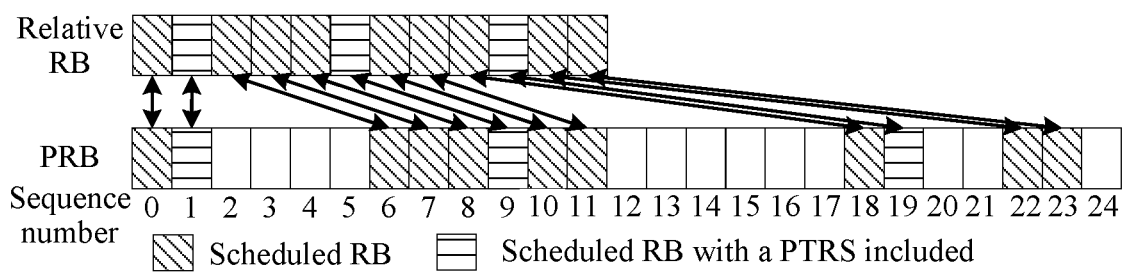
FIG. 4 is a schematic diagram of a relationship between a frequency domain position of a relative RB to which a PTRS is to be mapped and a frequency domain position of a PRB to which the PTRS is to be mapped according to an embodiment of this application.

FIG. 4 is a schematic diagram of a relationship between a frequency domain position of a relative RB to which a PTRS is to be mapped and a frequency domain position of a PRB to which the PTRS is to be mapped according to an embodiment of this application. As shown in FIG. 4, it is assumed that the network device schedules, for the terminal device, a total of 12 noncontiguous PRBs whose sequence numbers are 0, 1, 6, 7, 8, 9, 10, 11, 18, 19, 22, and 23, and a frequency domain density of a PTRS is 4.

Because the 12 PRBs scheduled by the network device are noncontiguous, and the frequency domain density of the PTRS is 4, in other words, a symbol is mapped to one in every four RBs, the network device needs to determine a specific PRB to which the PTRS is to be mapped.

Optionally, it is assumed that there are a total of 12 contiguous relative RBs whose sequence numbers are 0, 1, 2, . . . , and 11, and the 12 noncontiguous PRBs successively correspond to the 12 relative RBs in ascending order of sequence numbers of the PRBs. For example, a PRB whose sequence number is 0 corresponds to a relative RB whose sequence number is 0, a PRB whose sequence number is 1 corresponds to a relative RB whose sequence number is 1, a PRB whose sequence number is 6 corresponds to a relative RB whose sequence number is 2, a PRB whose sequence number is 7 corresponds to a relative RB whose sequence number is 3, . . . , and a PRB whose sequence number is 23 corresponds to a relative RB whose sequence number is 11.

When the frequency domain density that is of the PTRS and that is configured by the network device for the terminal device is 4 (in other words, a PTRS is mapped to one in every four RBs) and a resource block offset of a frequency domain position of the PTRS is one RB, a frequency domain position of a relative RB to which the PTRS is to be mapped includes the relative RB whose sequence number is 1, a relative RB whose sequence number is 5, and a relative RB whose sequence number is 9.

The network device may determine, based on the correspondence between a relative RB and a PRB, that a frequency domain position of a PRB to which the PTRS is to be mapped includes the PRB whose sequence number is 1, a PRB whose sequence number is 9, and a PRB whose sequence number is 19.

Therefore, the network device may perform transmission of the PTRS with the terminal device on the PRB whose sequence number is 1, the PRB whose sequence number is 9, and the PRB whose sequence number is 19.

It should be understood that the terminal device determines, in a similar manner to the network device, the resource position of the PRB to which the PTRS is to be mapped. To avoid repetition, details are not described herein again.

It should be further understood that the foregoing method for determining a relationship between a frequency domain position of a relative RB to which a PTRS is to be mapped and a frequency domain position of a PRB to which the PTRS is to be mapped is also applicable to a scenario in which PRBs are contiguous, and this is not limited in this embodiment of this application.

Optionally, in this embodiment of this application, at least one relative RB in ascending order of numbers (or sequence numbers or indexes) may be obtained in ascending order of sequence numbers of at least one VRB (virtual resource block) scheduled by the network device, and this is not limited in this embodiment of this application. The network device or the terminal device may determine, based on a frequency domain position of a relative RB to which the PTRS is to be mapped, a frequency domain position of a VRB to which the PTRS is to be mapped.

Optionally, the reference signal transmission method provided in this embodiment of this application may be applied to an uplink transmission scenario of a reference signal, or may be applied to a downlink transmission scenario of a reference signal, and this is not limited in this embodiment of this application.

In the downlink transmission scenario, S330 may be that the network device sends the PTRS to the terminal device based on the resource block offset of the frequency domain position of the PTRS, and correspondingly, the terminal device receives, based on the resource block offset of the frequency domain position of the PTRS, the PTRS sent by the network device.

In the uplink transmission scenario, S330 may be that the terminal device sends the PTRS to the network device based on the resource block offset of the frequency domain position of the PTRS, and correspondingly, the network device receives, based on the resource block offset of the frequency domain position of the PTRS, the PTRS sent by the terminal device.

Optionally, after S330, the network device may perform phase noise estimation based on the PTRS, and correspondingly, the terminal device may also perform phase noise estimation based on the PTRS.

According to the reference signal transmission method provided in this embodiment of this application, because a multi-user multiple-input multiple-output (MU-MIMO) technology supports non-orthogonal multiplexing between PTRS ports and between a PTRS port and data, a frequency domain position of at least one resource block to which a PTRS of the terminal device is to be mapped is determined based on at least one of the identifier of the terminal device, the PTRS information, and the first bandwidth, so that paired PTRSs of the terminal device can be mapped to different frequency domain positions by using a resource block offset. In other words, the PTRS of the terminal device is interfered by data of another terminal device, and PTRS interference of the terminal device is more random by randomizing the data of the another terminal device, to help randomize the PTRS interference of the terminal device, thereby stabilizing performance of PTRS-based noise estimation.

It should be understood that according to the method 300, the network device or the terminal device can determine a frequency domain position of a resource block (PRB) to which a PTRS is to be mapped. The following describes in detail how the network device or the terminal device determines a frequency domain position of a resource element to which the PTRS is to be mapped in the resource block.

Figure 5:
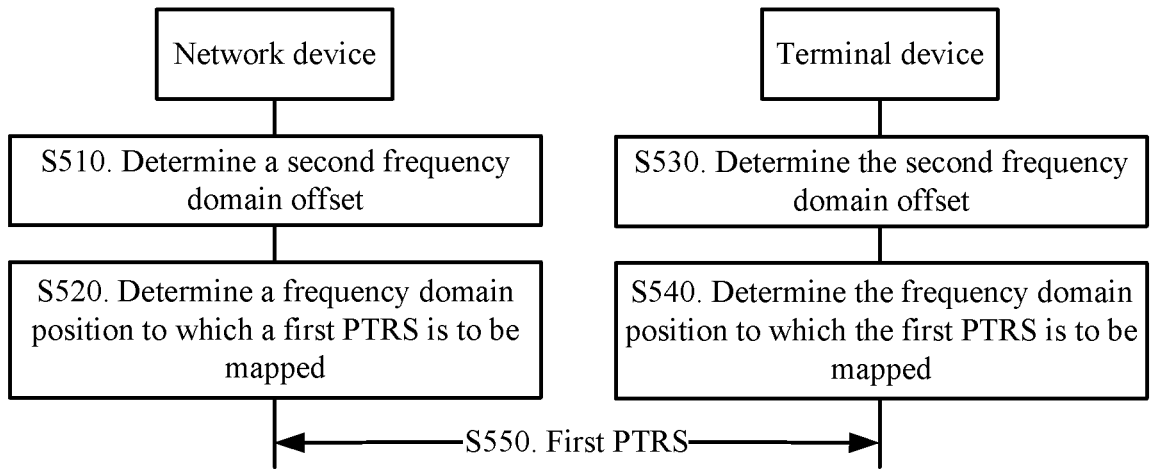
FIG. 5 is a schematic flowchart of another reference signal transmission method according to an embodiment of this application.

FIG. 5 shows a reference signal transmission method 500 according to an embodiment of this application. The transmission method 500 may be applied to the communications system 100 shown in FIG. 1.

S510. During S510, a network device determines a second frequency domain offset based on a first frequency domain offset and at least one subcarrier to which a DMRS of a terminal device is to be mapped in a first resource block, where the first resource block is a resource block to which a first PTRS of the terminal device is to be mapped, the first frequency domain offset is used to determine, from the first resource block, a frequency domain position of a resource element to which the first PTRS is to be mapped, and the second frequency domain offset is used to determine, from the at least one subcarrier, a frequency domain position to which the first PTRS is to be mapped.

Optionally, the first resource block is a resource block to which the first PTRS of the terminal device is to be mapped, and the first resource block may be determined according to the foregoing method 300, or may be determined in another manner. This is not limited in this embodiment of this application.

Optionally, the network device may obtain, in a plurality of manners, the at least one subcarrier to which the DMRS of the terminal device is to be mapped in the first resource block, and this is not limited in this embodiment of this application.

In an optional embodiment, the network device may configure, for the terminal device, the at least one subcarrier to which the DMRS is to be mapped.

It should be understood that because a resource element/a subcarrier to which the PTRS is to be mapped needs to be in a subcarrier set occupied by a DMRS port associated with the first PTRS, the network device may determine, based on scheduling information of the DMRS, at least one subcarrier occupied by the DMRS port, associated with the PTRS, in one symbol in the first resource block. The at least one subcarrier is denoted as a subcarrier set $S1=\{RE_1, RE_2, \ldots, RE_P\}$, $RE_i$ indicates a number/an index of a subcarrier to which the DMRS port is to be mapped in the first resource block, a value range of i is $\{1, \ldots, P\}$, P is a total quantity of subcarriers occupied by the DMRS port in one symbol in the first resource block, and $RE_1 < RE_2 < RE_3, \ldots, < RE_P$.

Figure 6:
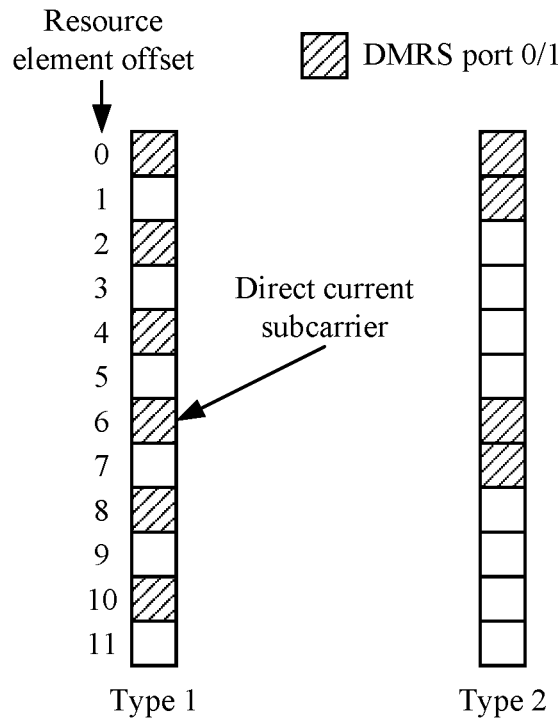
FIG. 6 is a schematic diagram of a frequency domain position of a subcarrier to which a DMRS is to be mapped according to an embodiment of this application.

Optionally, FIG. 6 is a schematic diagram of a frequency domain position of a subcarrier to which a DMRS port $Q_0/Q_1$ is to be mapped in a first resource block. As shown in FIG. 6, a frequency domain offset 0 to a frequency domain offset 11 respectively correspond to subcarrier 0 to subcarrier 11 in one symbol in the first resource block. When a DMRS configuration is type 1, a subcarrier set occupied by one DMRS port in one RB is $S1=\{0, 2, 4, 6, 8, 10\}$ respectively corresponding to $RE_1$ to $RE_6$, and in this case, P=6. When a to-be-mapped DMRS is of a type 2, a subcarrier set occupied by one DMRS port in one RB is $S1=\{0, 1, 6, 7\}$ respectively corresponding to $RE_1$ to $RE_4$, and in this case, P=4.

It should be understood that $Q_0/Q_1$ of a DMRS port in this embodiment of this application indicates a number/an identifier of the DMRS port.

Optionally, when a subcarrier occupied by the DMRS port associated with the PTRS includes a direct current (DC) subcarrier, to avoid a conflict between the PTRS and the DC subcarrier, a subcarrier number/index of the direct current subcarrier needs to be removed from the subcarrier set, to obtain a new subcarrier set $S2=S1-\{RE_{DC}\}$, where $RE_{DC}$ is the number/index of the DC subcarrier to which the PTRS is to be mapped in the first resource block.

For example, as shown in FIG. 6, when a port $Q_0/Q_1$ of the type 1 is configured for the DMRS, $S1=\{0, 2, 4, 6, 8, 10\}$; if the DC subcarrier (subcarrier 6) coincides with a fourth subcarrier to which the DMRS port is to be mapped in the first resource block, that is, $RE_4$ in S1, $RE_4$ in the set S1 is removed to obtain a new subcarrier set $S2=\{0, 2, 4, 8, 10\}$ respectively corresponding to $RE_1$ to $RE_5$.

For another example, as shown in FIG. 6, when a port $Q_0/Q_1$ of the type 2 is configured for the DMRS, $S1=\{0, 1, 6, 7\}$, if no DC subcarrier exists in the first resource block for the DMRS port, S1 does not need to be processed, and $S2=S1=\{0, 1, 6, 7\}$.

Because the DC subcarrier is removed from the subcarrier set occupied by the DMRS port associated with the first PTRS, the following problem can be avoided: the first PTRS is mapped to a frequency domain position on which the DC subcarrier is located, which causes a conflict between the PTRS and the DC subcarrier.

It should be understood that the first frequency domain offset indicates a resource element offset of the frequency domain position to which the first PTRS is to be mapped in the first resource block.

Optionally, the network device may obtain the first frequency domain offset in an explicit indication manner or an implicit indication manner, and this is not limited in this embodiment of this application.

In the explicit indication manner, the first frequency domain offset may be configured by the network device for the terminal device by using second signaling.

Optionally, the second signaling may be RRC signaling, MAC CE signaling, or DCI signaling, and this is not limited in this embodiment of this application.

In the implicit indication manner, the network device may determine the first frequency domain offset based on reference information of the terminal device, where the reference information includes at least one of an identifier of the terminal device and scheduling information of the terminal device.

Optionally, the scheduling information of the terminal device may include, for example, at least one of the following information: scheduling information of the demodulation reference signal (DMRS), scheduling information of the PTRS, scheduling information of a reference signal (RS) such as scheduling information of a sounding reference signal (SRS), and scheduling information of a codeword. This is not limited in this embodiment of this application.

Optionally, the scheduling information of the DMRS may include at least one of a port number, a port quantity, a port pattern, a resource element mapping (resource element mapping), a sequence scrambling index/number, and a subcarrier sequence number/resource element of the DMRS. The scheduling information of the first PTRS may include at least one of a port number, a port quantity, a frequency domain density, a resource element mapping, and a sequence scrambling index/number of the first PTRS. The scheduling information of the SRS may include at least one of a port number, a port quantity, a port pattern, a resource element mapping, a sequence scrambling index/number, and a subcarrier sequence number/resource element of the SRS. The scheduling information of the codeword may include a codeword number and/or a codeword quantity of the codeword.

Optionally, the network device may determine the first frequency domain offset $k_{offset}$ in the following manners:

Manner 1: $k_{offset}=P_{DMRS}$, or $k_{offset}=P_{PTRS}$, or $k_{offset}=ID_{UE}$, or $k_{offset}=ID_{SC}$, or $k_{offset}=ID_{Cell}$.

Where: $P_{DMRS}$ indicates a DMRS port number of the terminal device, $P_{PTRS}$ indicates a PTRS port number of the terminal device, $ID_{UE}$ indicates the identifier of the terminal device, $ID_{SC}$ indicates a sequence scrambling ID of the first PTRS or a sequence scrambling ID of the DMRS port associated with the PTRS, and $ID_{Cell}$ indicates a cell identifier.

Manner 2: $k_{offset}=\mathrm{mod}(P_{DMRS}, 12)$, or $k_{offset}=\mathrm{mod}(P_{PTRS}, 12)$, or $k_{offset}=\mathrm{mod}(ID_{UE}, 12)$, or $k_{offset}=\mathrm{mod}(ID_{SC}, 12)$, or $k_{offset}=\mathrm{mod}(ID_{Cell}, 12)$.

Manner 3: $k_{offset}=P_{DMRS}-P_{DMRS\_min}$, or $k_{offset}=P_{PTRS}-P_{PTRS\_min}$.

Where: $P_{DMRS\_min}$ indicates a smallest DMRS port number, and $P_{PTRS\_min}$ indicates a smallest PTRS port number.

It should be understood that because the frequency domain position that is of the resource element to which the first PTRS is to be mapped and that is determined by the network device based on the first frequency domain offset possibly cannot exactly correspond to a subcarrier to which the DMRS is to be mapped, a mapping relationship is required to map the first frequency domain offset to a subcarrier set of the DMRS, in other words, the second frequency domain offset for mapping the first PTRS to the subcarrier set needs to be determined.

For RE-level offset, the PTRS should be mapped on the subcarrier which carried the associated DMRS also. To realize the characteristics, a set which only including the subcarriers of the associated DMRS port and preclude the DC tone is defined, and the RE-level offset k implicitly or explicitly indicated is mapped to the relative offset k' in the set, and the k'th+1 subcarrier is chosen for PTRS mapping within a given RB, and the mapping rule between k and k' can be denoted as with k'=mod(k, S), where S is the size of the set.

For example, as shown in FIG. 6, when the first frequency domain offset is 11 and a DMRS port of the type 1 is configured, it may be determined, based on the first offset, that the first PTRS is to be mapped to subcarrier 11, and because the subcarrier set S2={0, 2, 4, 8, 10} (the DC subcarrier has been removed from S1), it can be learned that subcarrier 11 does not belong to S2.

Optionally, when the first frequency domain offset is $k_{offset}$ and the subcarrier set S2 includes P subcarriers, the network device may determine the second frequency domain offset in the following manners:

Manner 1: $k'_{offset}=\mathrm{mod}(k_{offset}, P)$.

P indicates a quantity of subcarriers in the set S2.

Manner 2: $k'_{offset}=\mathrm{Int}(k_{offset}*P/12)$.

For example, as shown in FIG. 6, when the first frequency domain offset is 11, the subcarrier set S2={0, 2, 4, 8, 10}, namely, P=5, it may be determined, in Manner 1, that the second frequency domain offset is 1, in other words, the first PTRS is to be mapped to $RE_2$ in the subcarrier set S1, that is, subcarrier 2.

S520. During S520, the network device determines, based on a frequency domain position of the at least one subcarrier and the second frequency domain offset, the frequency domain position to which the first PTRS is to be mapped.

Optionally, the network device determines, based on the second frequency domain offset and a position of each subcarrier in the subcarrier set, the frequency domain position to which the first PTRS is to be mapped.

For example, when the subcarrier set is S2={0, 2, 4, 8, 10} and the second frequency domain offset of the first PTRS is 3, the frequency domain position to which the first PTRS is to be mapped is $RE_4$, in other words, the first PTRS is mapped to the fourth subcarrier (subcarrier 8) in S2.

S530. During S530, the terminal device determines the second frequency domain offset based on the first frequency domain offset and the at least one subcarrier to which the DMRS of the terminal device is to be mapped in the first resource block.

S540. During S540, the terminal device determines, based on the frequency domain position of the at least one subcarrier and the second frequency domain offset, the frequency domain position to which the first PTRS is to be mapped.

It should be understood that S530 is similar to S510 and S540 is similar to S520. To avoid repetition, details are not described herein again with respect to S.

It should be further understood that there is no order for performing S510 and S530.

S550. During S550, the network device performs transmission of the first PTRS with the terminal device based on the frequency domain position to which the first PTRS is to be mapped, and correspondingly, the terminal device performs transmission of the first PTRS with the network device based on the frequency domain position to which the first PTRS is to be mapped.

Optionally, when positions to which two different PTRS ports are to be mapped in the first resource block are the same, for example, as shown in FIG. 6, when a DMRS of a type 1 is configured, assuming that second frequency domain offsets determined for a first PTRS and a second PTRS are both 1 (in other words, both the PTRS 1 and the PTRS 2 are to be mapped to subcarrier 4 in the subcarrier set occupied by the DMRS port), the first PTRS and the second PTRS interfere with each other. Therefore, it may be ensured, in the following manners, that frequency domain positions to which the two different PTRSs are to be mapped are different.

Optionally, the first PTRS and the second PTRS may correspond to different PTRS ports of a same terminal device, or may correspond to different terminal devices. This is not limited in this embodiment of this application.

Manner 1: $k'_{offset1}=k'_{offset2}+1$, or $k'_{offset1}=k'_{offset2}-1$.

Where: $k'_{offset1}$ indicates a second frequency domain offset of the first PTRS, and $k'_{offset2}$ indicates a second frequency domain offset of the second PTRS.

Assuming that the subcarrier set is $S2=\{RE_1, RE_2, \ldots, RE_P\}$, when the second frequency domain offset of the first PTRS is the same as the frequency domain offset of the second PTRS, the network device may determine $RE_{j-1}$ or $RE_{j+1}$ adjacent to $RE_j$ in the subcarrier set as a frequency domain position of a resource element to which the first PTRS is to be mapped, and perform transmission of the first PTRS with the terminal device on $RE_{j-1}$ or $RE_{j+1}$, where $RE_j$ indicates the frequency domain position of the resource element corresponding to the second frequency domain offset of the first PTRS, and a value range of j is $\{1, 2, \ldots, P\}$.

Optionally, when an adjacent subcarrier falls beyond a range, a value may be cyclically used based on a quantity of elements in the set.

For example, when j−1=0, j−1 may be set to P, in other words, when the value is less than a smallest number, a cyclic process is performed to the end of the set to obtain a largest value.

For example, when j+1=P+1, j−1 may be set to 1, in other words, when the value is greater than a largest number, a cyclic process is performed to the start of the set to obtain a smallest value.

Correspondingly, the network device performs transmission of the second PTRS with the terminal device on $RE_j$.

Manner 2: $k'_{offset2}=k'_{offset1}+1$, or $k'_{offset2}=k'_{offset1}-1$.

Assuming that the subcarrier set is $S2=\{RE_1, RE_2, \ldots, RE_P\}$, when the second frequency domain offset of the first PTRS is the same as the frequency domain offset of the second PTRS, the network device may determine $RE_{j-1}$ or $RE_{j+1}$ adjacent to $RE_j$ in the subcarrier set as a frequency domain position of a resource element to which the second PTRS is to be mapped, and perform transmission of the second PTRS with the terminal device on $RE_{j-1}$ or $RE_{j+1}$, where $RE_j$ indicates the frequency domain position of the resource element corresponding to the second frequency domain offset of the second PTRS, and a value range of j is $\{1, 2, \ldots, P\}$.

Optionally, when an adjacent subcarrier falls beyond a range, a value may be cyclically used based on a quantity of elements in the set.

For example, when j−1=0, j−1 may be set to P, in other words, when the value is less than a smallest number, a cyclic process is performed to the end of the set to obtain a largest value.

For example, when j+1=P+1, j−1 may be set to 1, in other words, when the value is greater than a largest number, a cyclic process is performed to the start of the set to obtain a smallest value.

Correspondingly, the network device performs transmission of the first PTRS with the terminal device on $RE_j$.

For example, it is assumed that the subcarrier set is $S2=\{0, 2, 4, 8, 10\}$, and both the second frequency domain offset of the first PTRS and the second frequency domain offset of the second PTRS are 2, in other words, both the first PTRS and the second PTRS are to be mapped to the third subcarrier (subcarrier 4).

Optionally, the network device may perform transmission of the first PTRS with the terminal device on the third subcarrier (subcarrier 4), and perform transmission of the second PTRS with the terminal device on the second subcarrier (subcarrier 2)/the fourth subcarrier (subcarrier 8).

Optionally, the network device may perform transmission of the second PTRS with the terminal device on the third subcarrier (subcarrier 4), and perform transmission of the first PTRS with the terminal device on the second subcarrier (subcarrier 2)/the fourth subcarrier (subcarrier 8).

It should be understood that a relative offset (the second frequency domain offset) in a subcarrier set may be defined, and is used to indicate a subcarrier to which a PTRS is to be mapped in a given resource block. The subcarrier set includes a subcarrier occupied by a DMRS port associated with the PTRS, and includes no direct current subcarrier. A relative offset among the subcarrier set only includes the subcarrier occupied by the associated DMRS port, and does not include the DC tone.

According to the reference signal transmission method provided in this embodiment of this application, when the frequency domain position of the resource element to which the first PTRS is to be mapped is the same as the frequency domain position of the resource element to which the second PTRS is to be mapped, the frequency domain position of the resource element to which the first PTRS is to be mapped or the frequency domain position of the resource element to which the second PTRS is to be mapped may be adjusted, so that the first PTRS and the second PTRS are mapped to two different subcarriers in the subcarrier set occupied by the DMRS port, and the two subcarriers have adjacent numbers or indexes in the subcarrier set, thereby avoiding mutual interference between the first PTRS and the second PTRS.

With reference to FIG. 1 to FIG. 6, the foregoing describes in detail the reference signal transmission method provided in the embodiments of this application. With reference to FIG. 7 to FIG. 14, the following describes a reference signal transmission apparatus provided in the embodiments of this application.

Figure 7:
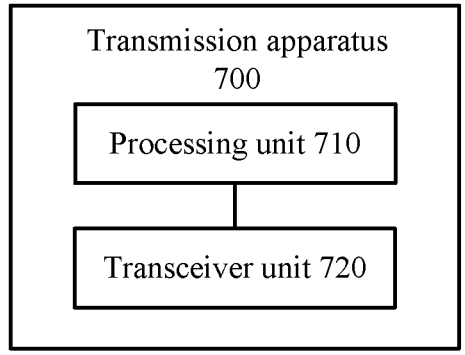
FIG. 7 is a schematic block diagram of a reference signal transmission apparatus according to an embodiment of this application.

FIG. 7 shows a reference signal transmission apparatus 700 according to an embodiment of this application. The transmission apparatus 700 includes:

a processing unit 710, configured to determine a resource block offset of a frequency domain position of a phase tracking reference signal (PTRS) of a terminal device based on PTRS information of the terminal device, an identifier of the terminal device, and first bandwidth, where the PTRS information includes a frequency domain density or a frequency domain interval of the PTRS, and the first bandwidth is bandwidth scheduled for the terminal device; and a transceiver unit 720, configured to perform transmission of the PTRS with the terminal device based on the resource block offset that is of the frequency domain position of the PTRS and that is determined by the processing unit 710.

Optionally, the processing unit is specifically configured to: before determining the resource block offset of the frequency domain position of the PTRS of the terminal device based on the PTRS information of the terminal device, the identifier of the terminal device, and the first bandwidth, determine a maximum quantity of PTRSs and a minimum quantity of PTRSs that can be mapped under the conditions of the PTRS information and the first bandwidth; and when a ratio of the minimum quantity of PTRSs to the maximum quantity of PTRSs is less than or equal to a first preset value, determine the resource block offset of the frequency domain position of the PTRS based on the PTRS information of the terminal device, the identifier of the terminal device, and the first bandwidth.

Optionally, the processing unit is specifically configured to: perform modulo processing on the first bandwidth based on the PTRS information, to obtain second bandwidth; and determine the resource block offset of the frequency domain position of the PTRS based on the second bandwidth and the identifier of the terminal device.

Optionally, the processing unit is specifically configured to: when the ratio of the minimum quantity of PTRSs to the maximum quantity of PTRSs is greater than the first preset value, determine the resource block offset of the frequency domain position of the PTRS based on the PTRS information and the identifier of the terminal device.

It should be understood that the transmission apparatus 700 herein is embodied in the form of functional units. The term "unit" herein may be an application-specific integrated circuit (ASIC), an electronic circuit, a processor (for example, a shared processor, a dedicated processor, or a group processor) for executing one or more software or firmware programs, a memory, a combinational logic circuit, and/or another appropriate component supporting the described functions. In an optional example, a person skilled in the art may understand that the transmission apparatus 700 may be specifically the network device in the embodiment of the transmission method 300, and the transmission apparatus 700 may be configured to perform procedures and/or steps that are corresponding to the network device in the embodiment of the method 300. To avoid repetition, details are not described herein again.

Figure 8:
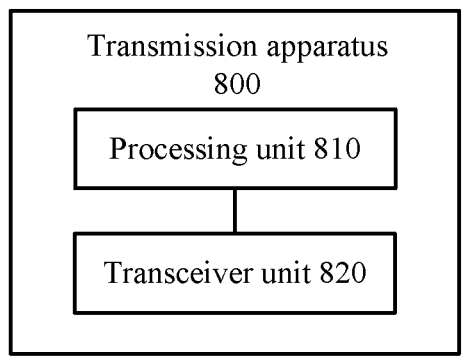
FIG. 8 is a schematic block diagram of another reference signal transmission apparatus according to an embodiment of this application.

FIG. 8 shows a reference signal transmission apparatus 800 according to an embodiment of this application. The transmission apparatus 800 includes:

a processing unit 810, configured to determine a resource block offset of a frequency domain position of a phase tracking reference signal (PTRS) based on PTRS information, an identifier of the transmission apparatus, and first bandwidth, where the PTRS information includes a frequency domain density or a frequency domain interval of the PTRS, and the first bandwidth is bandwidth scheduled by a network device for the transmission apparatus; and a transceiver unit 820, configured to perform transmission of the PTRS with the network device based on the resource block offset that is of the frequency domain position of the PTRS and that is determined by the processing unit 810.

Optionally, the processing unit is specifically configured to: before determining the resource block offset of the frequency domain position of the PTRS based on the PTRS information, the identifier of the transmission apparatus, and the first bandwidth, determine a maximum quantity of PTRSs and a minimum quantity of PTRSs that can be mapped under the conditions of the PTRS information and the first bandwidth; and when a ratio of the minimum quantity of PTRSs to the maximum quantity of PTRSs is less than or equal to a first preset value, determine the resource block offset of the frequency domain position of the PTRS based on the PTRS information, the identifier of the transmission apparatus, and the first bandwidth.

Optionally, the processing unit is specifically configured to: perform modulo processing on the first bandwidth based on the PTRS information, to obtain second bandwidth; and determine the resource block offset of the frequency domain position of the PTRS based on the second bandwidth and the identifier of the transmission apparatus.

Optionally, the processing unit is specifically configured to: when the ratio of the minimum quantity of PTRSs to the maximum quantity of PTRSs is greater than the first preset value, determine the resource block offset of the frequency domain position of the PTRS based on the PTRS information and the identifier of the transmission apparatus.

It should be understood that the transmission apparatus 800 herein is embodied in the form of functional units. The term "unit" herein may be an ASIC, an electronic circuit, a processor (for example, a shared processor, a dedicated processor, or a group processor) for executing one or more software or firmware programs, a memory, a combinational logic circuit, and/or another appropriate component supporting the described functions. In an optional example, a person skilled in the art may understand that the transmission apparatus 800 may be specifically the terminal device in the embodiment of the transmission method 300, and the transmission apparatus 800 may be configured to perform procedures and/or steps that are corresponding to the terminal device in the embodiment of the transmission method 300. To avoid repetition, details are not described herein again.

Figure 9:
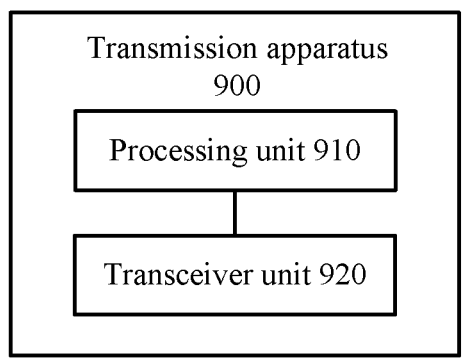
FIG. 9 is a schematic block diagram of still another reference signal transmission apparatus according to an embodiment of this application.

FIG. 9 shows a reference signal transmission apparatus 900 according to an embodiment of this application. The transmission apparatus 900 includes:

a processing unit 910, configured to: determine a second frequency domain offset based on a first frequency domain offset and at least one subcarrier to which a demodulation reference signal (DMRS) of a terminal device is to be mapped in a first resource block, where the first resource block is a resource block to which a first phase tracking reference signal (PTRS) of the terminal device is to be mapped, the first frequency domain offset is used to determine, from the first resource block, a frequency domain position of a resource element to which the first PTRS is to be mapped, and the second frequency domain offset is used to determine, from the at least one subcarrier, a frequency domain position to which the first PTRS is to be mapped; and determine, based on a frequency domain position of the at least one subcarrier and the second frequency domain offset, the frequency domain position to which the first PTRS is to be mapped; and a transceiver unit 920, configured to perform transmission of the first PTRS with the terminal device based on the frequency domain position to which the first PTRS is to be mapped and that is determined by the processing unit 910.

In a possible implementation, the at least one subcarrier includes no direct current subcarrier.

In a possible implementation, when both the frequency domain position to which the first PTRS is to be mapped and a frequency domain position to which a second PTRS of the terminal device is to be mapped are a first subcarrier in the at least one subcarrier, the transceiver unit is specifically configured to: determine a second subcarrier based on the first subcarrier, where the second subcarrier is a subcarrier spaced from the first subcarrier by a minimum quantity of subcarriers in the at least one subcarrier; and perform transmission of the first PTRS with the terminal device on the second subcarrier.

In a possible implementation, the transmission apparatus further includes an obtaining unit. The obtaining unit is configured to: before the second frequency domain offset is determined based on the first frequency domain offset and the at least one subcarrier to which the DMRS of the terminal device is to be mapped in the first resource block, obtain reference information of the terminal device, where the reference information includes at least one of an identifier of the terminal device and scheduling information of the terminal device; and determine the first frequency domain offset based on the reference information of the terminal device.

In a possible implementation, the scheduling information of the terminal device includes at least one of the following information: scheduling information of the DMRS, scheduling information of the first PTRS, scheduling information of a sounding reference signal (SRS), and scheduling information of a codeword.

It should be understood that the transmission apparatus 900 herein is embodied in the form of functional units. The term "unit" herein may be an ASIC, an electronic circuit, a processor (for example, a shared processor, a dedicated processor, or a group processor) for executing one or more software or firmware programs, a memory, a combinational logic circuit, and/or another appropriate component supporting the described functions. In an optional example, a person skilled in the art may understand that the transmission apparatus 900 may be specifically the network device in the embodiment of the transmission method 500, and the transmission apparatus 900 may be configured to perform procedures and/or steps that are corresponding to the network device in the embodiment of the transmission method 500. To avoid repetition, details are not described herein again.

Figure 10:
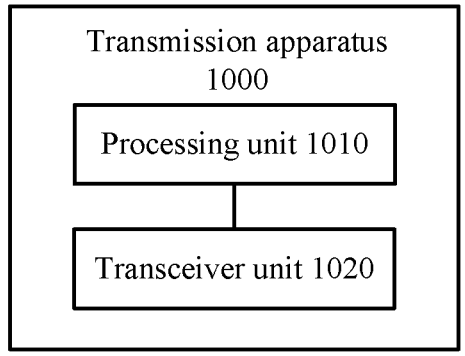
FIG. 10 is a schematic block diagram of yet another reference signal transmission apparatus according to an embodiment of this application.

FIG. 10 shows a reference signal transmission apparatus 1000 according to an embodiment of this application. The transmission apparatus 1000 includes:

a processing unit 1010, configured to: determine a second frequency domain offset based on a first frequency domain offset and at least one subcarrier to which a demodulation reference signal (DMRS) of the transmission apparatus is to be mapped in a first resource block, where the first resource block is a resource block to which a first phase tracking reference signal (PTRS) is to be mapped, the first frequency domain offset is used to determine, from the first resource block, a frequency domain position of a resource element to which the first PTRS is to be mapped, and the second frequency domain offset is used to determine, from the at least one subcarrier, a frequency domain position to which the first PTRS is to be mapped; and determine, based on a frequency domain position of the at least one subcarrier and the second frequency domain offset, the frequency domain position to which the first PTRS is to be mapped; and a transceiver unit 1020, configured to perform transmission of the first PTRS with the network device based on the frequency domain position to which the first PTRS is to be mapped and that is determined by the processing unit 1010.

In a possible implementation, the at least one subcarrier includes no direct current subcarrier.

In a possible implementation, when both the frequency domain position to which the first PTRS is to be mapped and a frequency domain position to which a second PTRS of the transmission apparatus is to be mapped are a first subcarrier in the at least one subcarrier, the transceiver unit is specifically configured to: determine a second subcarrier based on the first subcarrier, where the second subcarrier is a subcarrier spaced from the first subcarrier by a minimum quantity of subcarriers in the at least one subcarrier; and perform transmission of the first PTRS with the network device on the second subcarrier.

In a possible implementation, the transmission apparatus further includes an obtaining unit. The obtaining unit is configured to: before the second frequency domain offset is determined based on the first frequency domain offset and the at least one subcarrier to which the DMRS of the transmission apparatus is to be mapped in the first resource block, obtain reference information of the transmission apparatus, where the reference information includes at least one of an identifier of the transmission apparatus and scheduling information of the transmission apparatus; and determine the first frequency domain offset based on the reference information of the transmission apparatus.

In a possible implementation, the scheduling information of the transmission apparatus includes at least one of the following information: scheduling information of the DMRS, scheduling information of the first PTRS, scheduling information of a sounding reference signal (SRS), and scheduling information of a codeword.

It should be understood that the transmission apparatus 1000 herein is embodied in the form of functional units. The term "unit" herein may be an ASIC, an electronic circuit, a processor (for example, a shared processor, a dedicated processor, or a group processor) for executing one or more software or firmware programs, a memory, a combinational logic circuit, and/or another appropriate component supporting the described functions. In an optional example, a person skilled in the art may understand that the transmission apparatus 1000 may be specifically the terminal device in the embodiment of the transmission method 500, and the transmission apparatus 1000 may be configured to perform procedures and/or steps that are corresponding to the terminal device in the embodiment of the transmission method 500. To avoid repetition, details are not described herein again.

Figure 11:
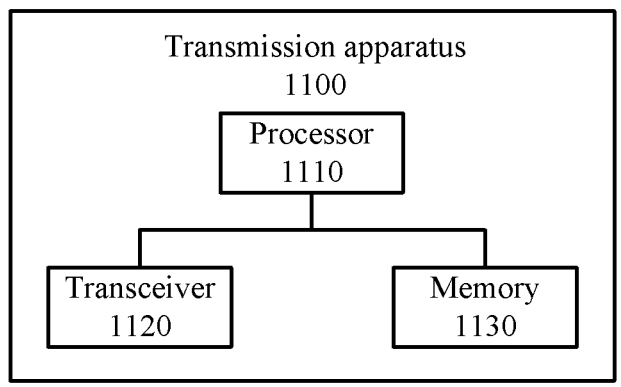
FIG. 11 is a schematic block diagram of yet another reference signal transmission apparatus according to an embodiment of this application.

FIG. 11 shows a reference signal transmission apparatus 1100 according to an embodiment of this application. The transmission apparatus 1100 may be a network device in the communications system shown in FIG. 1. A hardware architecture shown in FIG. 11 may be used for the network device. The network device may include a processor 1110, a transceiver 1120, and a memory 1130, and the processor 1110, the transceiver 1120, and the memory 1130 communicate with each other by using an internal connection path. Related functions implemented by the processing unit 710 in FIG. 7 may be implemented by the processor 1110, and related functions implemented by the transceiver unit 720 may be implemented by the transceiver 1120.

The processor 1110 may include one or more processors, for example, one or more central processing units (CPU). When the processor is one CPU, the CPU may be a single-core CPU, or may be a multi-core CPU.

The transceiver 1120 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (RAM), a read-only memory (ROM), an erasable programmable read only memory (EPROM), and a compact disc read-only memory (CD-ROM), and the memory 1130 is configured to store a related instruction and related data.

The memory 1130 is configured to store program code and data of the network device, and may be a separate component or integrated into the processor 1110.

Specifically, the processor 1110 is configured to control the transceiver to perform transmission of a reference signal with a terminal device, for example, perform a part of S330. For details, refer to the descriptions in the method embodiment, and details are not described herein again.

It may be understood that FIG. 11 merely shows a simplified design of the network device. In an actual application, the network device may further separately include other necessary elements, including but not limited to any quantity of transceivers, processors, controllers, memories, and the like, and all network devices that can implement this application fall within the protection scope of this application.

In a possible design, the transmission apparatus 1100 may be a chip, for example, may be a communications chip that may be used in a network device, and is configured to implement a related function of the processor 1110 in the network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

Figure 12:
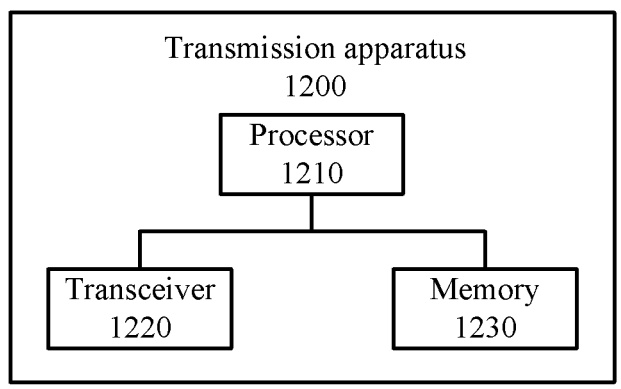
FIG. 12 is a schematic block diagram of yet another reference signal transmission apparatus according to an embodiment of this application.

FIG. 12 shows a reference signal transmission apparatus 1200 according to an embodiment of this application. The transmission apparatus 1200 may be a terminal device in the communications system shown in FIG. 1. A hardware architecture shown in FIG. 12 may be used for the terminal device. The terminal device may include a processor 1210, a transceiver 1220, and a memory 1230, and the processor 1210, the transceiver 1220, and the memory 1230 communicate with each other by using an internal connection path. Related functions implemented by the processing unit 810 in FIG. 8 may be implemented by the processor 1210, and related functions implemented by the transceiver unit 820 may be implemented by the transceiver 1220.

The processor 1210 may include one or more processors, for example, one or more central processing units CPUs. When the processor is one CPU, the CPU may be a single-core CPU, or may be a multi-core CPU.

The transceiver 1220 is configured to send data and/or a signal, and receive data and/or a signal. The transceiver may include a transmitter and a receiver. The transmitter is configured to send data and/or a signal, and the receiver is configured to receive data and/or a signal.

The memory 1230 includes but is not limited to a RAM, a ROM, an EPROM, or a CD-ROM, and the memory 1230 is configured to store a related instruction and related data.

The memory 1230 is configured to store program code and data of the terminal device, and may be a separate component or integrated into the processor 1210.

Specifically, the processor 1210 is configured to control the transceiver to perform transmission of a reference signal with a network device, for example, perform a part of S330. For details, refer to the descriptions in the method embodiment, and details are not described herein again.

It may be understood that FIG. 12 merely shows a simplified design of the terminal device. In an actual application, the terminal device may further separately include other necessary elements, including but not limited to any quantity of transceivers, processors, controllers, memories, and the like, and all terminal devices that can implement this application fall within the protection scope of this application.

In a possible design, the transmission apparatus 1200 may be a chip, for example, may be a communications chip that may be used in a terminal device, and is configured to implement a related function of the processor 1210 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

Figure 13:
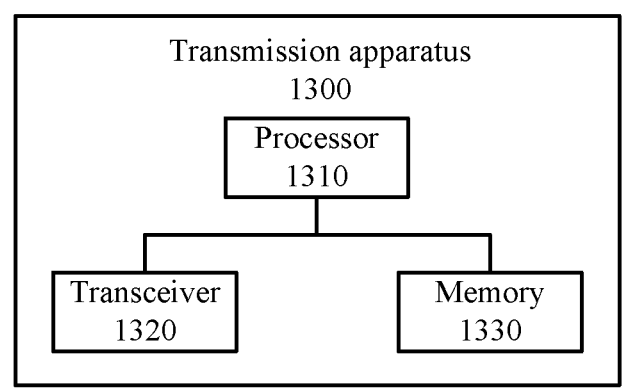
FIG. 13 is a schematic block diagram of yet another reference signal transmission apparatus according to an embodiment of this application.

FIG. 13 shows a reference signal transmission apparatus 1300 according to an embodiment of this application. The transmission apparatus 1300 may be a network device in the communications system shown in FIG. 1. A hardware architecture shown in FIG. 13 may be used for the network device. The network device may include a processor 1310, a transceiver 1320, and a memory 1330, and the processor 1310, the transceiver 1320, and the memory 1330 communicate with each other by using an internal connection path. Related functions implemented by the processing unit 910 in FIG. 9 may be implemented by the processor 1310, and related functions implemented by the transceiver unit 920 may be implemented by the transceiver 1320.

The processor 1310 may include one or more processors, for example, one or more central processing units (CPU). When the processor is one CPU, the CPU may be a single-core CPU, or may be a multi-core CPU.

The transceiver 1320 is configured to send data and/or a signal, and receive data and/or a signal. The transceiver may include a transmitter and a receiver. The transmitter is configured to send data and/or a signal, and the receiver is configured to receive data and/or a signal.

The memory 1330 includes but is not limited to a RAM, a ROM, an EPROM, or a CD-ROM, and the memory 1330 is configured to store a related instruction and related data.

The memory 1330 is configured to store program code and data of the network device, and may be a separate component or integrated into the processor 1310.

Specifically, the processor 1310 is configured to control the transceiver to perform transmission of a reference signal with a terminal device, for example, perform a part of S330. For details, refer to the descriptions in the method embodiment, and details are not described herein again.

It may be understood that FIG. 13 merely shows a simplified design of the network device. In an actual application, the network device may further separately include other necessary elements, including but not limited to any quantity of transceivers, processors, controllers, memories, and the like, and all network devices that can implement this application fall within the protection scope of this application.

In a possible design, the transmission apparatus 1300 may be a chip, for example, may be a communications chip that may be used in a network device, and is configured to implement a related function of the processor 1310 in the network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

Figure 14:
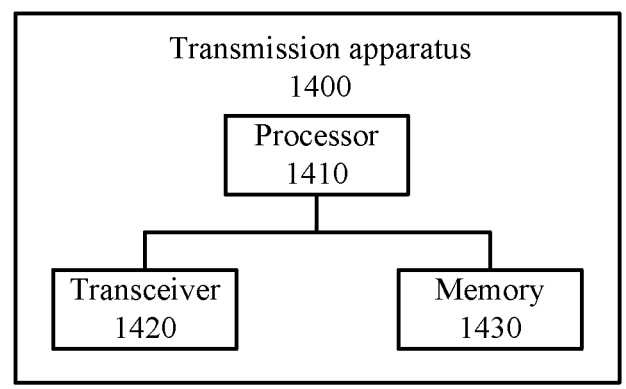
FIG. 14 is a schematic block diagram of yet another reference signal transmission apparatus according to an embodiment of this application.

FIG. 14 shows a reference signal transmission apparatus 1400 according to an embodiment of this application. The transmission apparatus 1400 may be a terminal device in the communications system shown in FIG. 1. A hardware architecture shown in FIG. 14 may be used for the terminal device. The terminal device may include a processor 1410, a transceiver 1420, and a memory 1430, and the processor

1410, the transceiver 1420, and the memory 1430 communicate with each other by using an internal connection path. Related functions implemented by the processing unit 1010 in FIG. 10 may be implemented by the processor 1410, and related functions implemented by the transceiver unit 1020 may be implemented by the transceiver 1420.

The processor 1410 may include one or more processors, for example, one or more central processing units CPUs. When the processor is one CPU, the CPU may be a single-core CPU, or may be a multi-core CPU.

The transceiver 1420 is configured to send data and/or a signal, and receive data and/or a signal. The transceiver may include a transmitter and a receiver. The transmitter is configured to send data and/or a signal, and the receiver is configured to receive data and/or a signal.

The memory 1430 includes but is not limited to a RAM, a ROM, an EPROM, or a CD-ROM, and the memory 1430 is configured to store a related instruction and related data.

The memory 1430 is configured to store program code and data of the terminal device, and may be a separate component or integrated into the processor 1410.

Specifically, the processor 1410 is configured to control the transceiver to perform transmission of a reference signal with a network device, for example, perform a part of S330. For details, refer to the descriptions in the method embodiment, and details are not described herein again.

It may be understood that FIG. 14 merely shows a simplified design of the terminal device. In an actual application, the terminal device may further separately include other necessary elements, including but not limited to any quantity of transceivers, processors, controllers, memories, and the like, and all terminal devices that can implement this application fall within the protection scope of this application.

In a possible design, the transmission apparatus 1400 may be a chip, for example, may be a communications chip that may be used in a terminal device, and is configured to implement a related function of the processor 1410 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code, and when executing the code, a processor implements a corresponding function.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions in the embodiments of this application are all or partially generated. The computer may be a general-purpose computer, a special-purpose computer, a computer network, or another programmable apparatus. The computer instructions may be stored in a computer readable storage medium or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the method embodiments may be performed. The storage medium includes any medium that can store program code, such as a ROM, a RAM, a magnetic disk, or an optical disc.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal transmission method, comprising:
determining a resource block offset of a frequency domain position of a phase tracking reference signal (PTRS) based on a frequency domain density of the PTRS, an identifier of a terminal device, and a first bandwidth, when a ratio of the first bandwidth to the frequency domain density of the PTRS is a non-integer; wherein the first bandwidth is a bandwidth scheduled by a network device for the terminal device; and
performing a transmission of the PTRS with the network device based on the resource block offset of the frequency domain position of the PTRS.

2. The transmission method according to claim 1, wherein the resource block offset of the frequency domain position of the PTRS, the frequency domain density of the PTRS, the first bandwidth and the identifier of the terminal device meet following relation:

$$\Delta f = ID_{UE} \bmod (BW_1 \bmod FD_{step}), \text{ where:}$$

$FD_{step}$ is the frequency domain density of the PTRS, $BW_1$ is the first bandwidth, $ID_{UE}$ is the identifier of the terminal device, $\Delta f$ is the resource block offset of the frequency domain position of the PTRS.

3. The transmission method according to claim 1, further comprising:
determining the resource block offset of the frequency domain position of the PTRS based on the frequency domain density of the PTRS and the identifier of the terminal device when the ratio of the first bandwidth to the frequency domain density of the PTRS is an integer; wherein the resource block offset of the frequency domain position of the PTRS, the frequency domain density of the PTRS, and the identifier of the terminal device meet following relation:

$$\Delta f = ID_{UE} \bmod FD_{step}, \text{ where:}$$

$FD_{step}$ is the frequency domain density of the PTRS, $ID_{UE}$ is the identifier of the terminal device, $\Delta f$ is the resource block offset of the frequency domain position of the PTRS.

4. A reference signal transmission apparatus, comprising:
a processor, configured to determine a resource block offset of a frequency domain position of a phase tracking reference signal (PTRS) based on a frequency domain density of the PTRS, an identifier of the transmission apparatus, and a first bandwidth, when a ratio of the first bandwidth to the frequency domain density of the PTRS is a non-integer; wherein the first bandwidth is a bandwidth scheduled by a network device for the transmission apparatus; and
a transceiver, configured to perform a transmission of the PTRS with the network device based on the resource block offset of the frequency domain position of the PTRS.

5. The transmission apparatus according to claim 4, wherein the resource block offset of the frequency domain position of the PTRS, the frequency domain density of the PTRS, the first bandwidth and the identifier of the transmission apparatus meet following relation:

$$\Delta f = ID_{UE} \bmod (BW_1 \bmod FD_{step}), \text{ where:}$$

$FD_{step}$ is the frequency domain density of the PTRS, $BW_1$ is the first bandwidth, $ID_{UE}$ is the identifier of the transmission apparatus, $\Delta f$ is the resource block offset of the frequency domain position of the PTRS.

6. The transmission apparatus according to claim 4, wherein:
the processor is further configured to: determine the resource block offset of the frequency domain position of the PTRS based on the frequency domain density of the PTRS and the identifier of the transmission apparatus when the ratio of the first bandwidth to the frequency domain density of the PTRS is an integer; wherein the resource block offset of the frequency domain position of the PTRS, the frequency domain density of the PTRS, and the identifier of the transmission apparatus meet following relation:

$$\Delta f = ID_{UE} \bmod FD_{step}, \text{ where:}$$

$FD_{step}$ is the frequency domain density of the PTRS, $ID_{UE}$ is the identifier of the transmission apparatus, $\Delta f$ is the resource block offset of the frequency domain position of the PTRS.

7. A non-transitory computer readable storage medium, wherein a computer program is stored in the computer readable storage medium, and when the program is executed, the transmission method is implemented, comprising:
determining a resource block offset of a frequency domain position of a phase tracking reference signal (PTRS) based on a frequency domain density of the PTRS, an identifier of a terminal device, and a first bandwidth, when a ratio of the first bandwidth to the frequency domain density of the PTRS is a non-integer; wherein the first bandwidth is a bandwidth scheduled by a network device for the terminal device; and
performing a transmission of the PTRS with the network device based on the resource block offset of the frequency domain position of the PTRS.

8. The non-transitory computer readable storage medium according to claim 7, wherein the resource block offset of the frequency domain position of the PTRS, the frequency domain density of the PTRS, the first bandwidth and the identifier of the terminal device meet following relation:

$$\Delta f = ID_{UE} \bmod (BW_1 \bmod FD_{step}), \text{ where:}$$

$FD_{step}$ is the frequency domain density of the PTRS, $BW_1$ is the first bandwidth, $ID_{UE}$ is the identifier of the terminal device, $\Delta f$ is the resource block offset of the frequency domain position of the PTRS.

9. The non-transitory computer readable storage medium according to claim 7, further comprising:
determining the resource block offset of the frequency domain position of the PTRS based on the frequency domain density of the PTRS and the identifier of the terminal device when the ratio of the first bandwidth to the frequency domain density of the PTRS is an integer; wherein the resource block offset of the frequency domain position of the PTRS, the frequency domain density of the PTRS, and the identifier of the terminal device meet following relation:

$\Delta f = ID_{UE} \bmod FD_{step}$, where:

$FD_{step}$ is the frequency domain density of the PTRS, $ID_{UE}$ is the identifier of the terminal device, $\Delta f$ is the resource block offset of the frequency domain position of the PTRS.

10. The transmission method according to claim 1, before the determining, further comprising:
  determining the frequency domain density of the PTRS according to configuration information of the PTRS, where the configuration information includes mapping relationship between the frequency domain density of the PTRS and the first bandwidth.

11. The transmission apparatus according to claim 4, wherein:
  the processor is further configured to determine the frequency domain density of the PTRS according to configuration information of the PTRS, where the configuration information includes mapping relationship between the frequency domain density of the PTRS and the first bandwidth.

12. The non-transitory computer readable storage medium according to claim 7, before the determining, further comprising:
  determining the frequency domain density of the PTRS according to configuration information of the PTRS, where the configuration information includes mapping relationship between the frequency domain density of the PTRS and the first bandwidth.

* * * * *